(12) United States Patent
Araki

(10) Patent No.: US 7,456,237 B2
(45) Date of Patent: Nov. 25, 2008

(54) COLORANT-CONTAINING CURABLE COMPOSITION, COLOR FILTER AND METHOD OF PRODUCING THE SAME

(75) Inventor: Katsumi Araki, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 247 days.

(21) Appl. No.: 10/920,254

(22) Filed: Aug. 18, 2004

(65) Prior Publication Data
US 2005/0043452 A1 Feb. 24, 2005

(30) Foreign Application Priority Data

Aug. 21, 2003 (JP) ............................. 2003-297080
Dec. 5, 2003 (JP) ............................. 2003-407488
Feb. 26, 2004 (JP) ............................. 2004-051642

(51) Int. Cl.
| | |
|---|---|
| C09D 4/00 | (2006.01) |
| C09B 45/00 | (2006.01) |
| C09B 46/00 | (2006.01) |
| G02B 1/04 | (2006.01) |
| G02B 1/12 | (2006.01) |
| C08K 5/13 | (2006.01) |
| C08K 5/23 | (2006.01) |
| C08K 5/18 | (2006.01) |
| C08K 5/42 | (2006.01) |

(52) U.S. Cl. ................... 524/461; 106/31.43; 522/6; 522/74; 522/78

(58) Field of Classification Search ........... 524/461; 106/31.43; 522/6, 74, 78
See application file for complete search history.

(56) References Cited

U.S. PATENT DOCUMENTS 5,098,477 A * 3/1992 Vieira et al. ............. 106/31.27
5,686,639 A * 11/1997 Cohen ....................... 556/33
2006/0210775 A1* 9/2006 Cser et al. ................. 428/192

FOREIGN PATENT DOCUMENTS

| EP | 0564168 A2 | 10/1993 |
|---|---|---|
| JP | 2-199403 A | 8/1990 |
| JP | 5-273411 A | 10/1993 |
| JP | 6-75375 A | 3/1994 |
| JP | 9-291241 A | 11/1997 |

* cited by examiner

Primary Examiner—Kelechi C Egwim
(74) Attorney, Agent, or Firm—Sughrue Mion, PLLC

(57) ABSTRACT

The present invention provides colorant-containing curable composition including a colorant of a metal salt having a di-valence or higher valence. The colorant is preferably a colorant of the compound represented by the following formula (I):

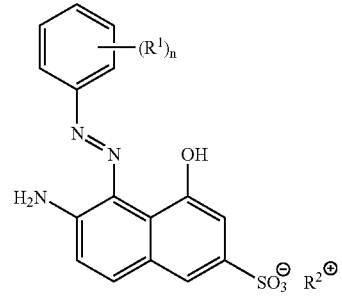

Formula (I)

wherein $R^1$ represents a hydrogen atom, an alkyl group having 1 to 21 carbon atoms, an alkoxy group having 1 to 21 carbon atoms, or an electron-attractive group; $R^2$ represents a cation having a charge equal to 1 valence of a cation of a metal atom having a valence of at least 2; and n represents an integer from 0 to 5.

14 Claims, No Drawings

COLORANT-CONTAINING CURABLE COMPOSITION, COLOR FILTER AND METHOD OF PRODUCING THE SAME

CROSS-REFERENCE TO RELATED APPLICATION

This application claims priority under 35 USC 119 from Japanese Patent Application Nos. 2003-297080, 2003-407488 and 2004-51642 the disclosures of which are incorporated by reference herein.

BACKGROUND OF THE INVENTION

1. Field of the Invention

The present invention relates to a colorant-containing curable composition for producing a color filter which can be suitably used in a liquid crystal display or a solid image pickup device (such as CCD and CMOS) to form a colored image, a color filter produced with such a composition, and a method of producing such a color filter.

2. Description of the Related Art

It is known that color filters for use in liquid crystal displays or solid image pickup devices are manufactured by a dyeing method, a printing method, an electrodeposition method, or a pigment-dispersing method.

The pigment-dispersing method is a method of producing the color filter by a photolithographic method with a colored radiosensitive composition comprising any photosensitive composition and a pigment dispersed therein. Such a method using a pigment is advantageously stable against light, heat or the like. The pigment-dispersing method, which includes patterning by a photolithographic method, has high positioning accuracy and thus has widely been used as a suitable method for producing color filters for use in large-screen or high-definition color displays.

The pigment-dispersing method may include the steps of forming, on a glass substrate, a coating layer by applying the radiosensitive composition with a spin coater, a roller coater or the like and drying it, exposing the coating layer to light to pattern it, then developing it to form colored pixels, and repeating such a process with respect to each color, so that a color filter is produced.

Specifically, as the pigment-dispersing method a negative-type photosensitive composition comprising an alkali-soluble resin, a photopolymerizable monomer and a photopolymerization initiator is conventionally known (for example, see Japanese Patent Application Laid-Open (JP-A) Nos. 02-199403 and 05-273411).

In recent years, there has been a demand for a higher definition of the color filter for use in the solid image pickup device. However, the conventional pigment dispersing system is not suited for such a fine pattern-requiring application as the solid image pickup device, because it cannot improve a resolution and has a problem that coarse particles of the pigment can cause color irregularities or the like. In order to solve the problem, some known methods use a dye (for example, see JP-A No. 06-75375).

However, a dye-containing curable composition can have any of new problems (1) to (4) below or the like.

(1) General dyes have low solubility in either an aqueous alkali solution or an organic solvent, and thus it would be difficult to obtain a liquid curable composition having a desired spectrum.

(2) Many dyes can interact with another component of the curable composition, and thus it can be difficult to control the solubility (development characteristic) of the cured part and the uncured part.

(3) If the dye has a low molar extinction coefficient ($\epsilon$), it must be added in a large amount of the dye so that the amount of any other component such as a polymerizable compound (monomer), a binder and a photopolymerization initiator in the curable composition must be reduced and so that the composition can have a problem such as a reduction in curability, post-curing heat resistance, and development performance of the (un)cured part.

(4) Generally, dyes are inferior to pigments in light fastness or heat resistance.

In contrast to use in the production of, a layer thickness of not more than 1.5 μm is particularly required for use in the production of color filter for solid image pickup devices. Thus, the curable composition should contain a large amount of dye and thus can have the above problem.

Due to these problems, it has been difficult to satisfy the practically required performance with respect to the colored pattern of a fine and thin layer for a high-definition color filter.

Specifically, concerning magenta dyes, there is a proposal of a red ink composition for use in a color filter, which contains a γ acid-phenylazo type or phenylazonaphthalene type dye (for example, see JP-A No. 09-291241). However, it is difficult for such a dye to satisfy both heat resistance and light fastness.

SUMMARY OF THE INVENTION

The present invention provides a colorant-containing curable composition which contains a colorant with good heat resistance and light fastness and can provide an improved development performance of an unexposed part and an improved residual layer rate of an exposed part and has good pattern-forming properties. The invention also provides a color filter using such a composition and a method of producing such a color filter.

A first aspect of the invention is to provide a colorant-containing composition, comprising a metal salt having a di-valence or higher valence as a colorant.

A second aspect of the invention is to provide a color filter, comprising a metal salt having a di-valence or higher valence as a colorant.

A third aspect of the invention is to provide a method of producing a color filter, comprising applying, to a substrate, a colorant-containing curable composition which contains a metal salt having a di-valence or higher valence as a colorant; then exposing the composition to light through a mask; and then developing the composition to form a pattern. If necessary, this method may include the pattern by heating and/or exposure to light, and such a process may be repeatedly performed twice or more.

DETAILED DESCRIPTION OF THE INVENTION

A detailed description is provided below of a colorant-containing curable composition of the present invention, a color filter of the invention using the composition and a method of producing the color filter of the invention.

Colorant-Containing Curable Composition

The composition of the invention (hereinafter also referred to as the composition of the invention) comprises a metal salt having a di-valence or higher valence as a colorant.

The composition of the invention preferably further comprises an alkali-soluble binder. In a case where the composition of the invention is a negative-type composition, it may further contain a monomer and a photopolymerization initiator, and optionally a cross-linking agent, in addition to the alkali-soluble binder and the colorant.

Colorant

The composition of the invention contains a metal salt having a di-valence or higher valence as a colorant. The metal salt having a di-valence or higher valence is preferably a metal salt having a di-valence or higher valence of an acid dye. The composition of the invention containing a metal salt having a di-valence or higher valence is a novel composition which can satisfy both of high light fastness and high heat resistance at the same time in an unprecedented manner and can exhibit good pattern-forming (development) properties and good liquid stability. The colorant of the invention is preferably an organic solvent-soluble dye.

The metal salt having a di-valence or higher valence may be a metal salt such as magnesium, calcium, strontium, barium, zinc, aluminum, copper, and iron. The metal salt having a di-valence or higher valence of the acid dye preferably includes at least one of an azo compound and a phthalocyanine compound and more preferably includes any of a γ acid-azo compound and a pyrazolone azo compound. Examples of the azo or phthalocyanine compound include an aromatic azo compound, a heteroaromatic azo compound and a metal-phthalocyanine compound.

The metal salt having a di-valence or higher valence preferably includes the compound represented by the following formula (I):

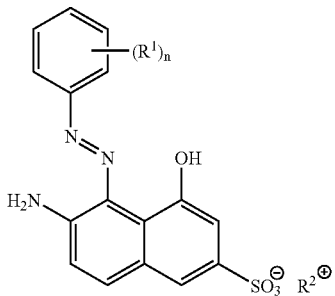

Formula (I)

wherein $R^1$ represents a hydrogen atom, an alkyl group having 1 to 21 carbon atoms, an alkoxy group having 1 to 21 carbon atoms, or an electron-attractive group; $R^2$ represents a cation having a charge equal to 1 valence of a cation of a metal atom having a valence of at least 2; and n represents an integer from 0 to 5.

The alkyl group having 1 to 21 carbon atoms represented by $R^1$ may have any substituent, and $R^1$ is more preferably alkyl having 1 to 15 carbon atoms. The alkyl group having 1 to 21 carbon atoms represented by $R^1$ may be straight-chain, branched alkyl or cyclic alkyl. Preferred examples of the alkyl include methyl, ethyl, n-propyl, n-butyl, n-amyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosanyl, isopropyl, sec-butyl, isobutyl, tert-butyl, 1-methylbutyl, 1-ethylpropyl, 2-methylbutyl, isoamyl, neopentyl, 1,2-dimethylpropyl, 1,1-dimethylpropyl, tert-amyl, 1,3-dimethylbutyl, 3,3-dimethylbutyl, 2-ethylbutyl, 2-ethyl-2-methylpropyl, straight-chain or branched heptyl, 1-methylheptyl, 2-ethylhexyl, 1,5-dimethylhexyl, tert-octyl, branched nonyl, branched decyl, branched undecyl, branched dodecyl, branched tridecyl, branched tetradecyl, branched pentadecyl, branched hexadecyl, branched heptadecyl, branched octadecyl, straight-chain or branched nonadecyl, straight-chain or branched eicosanyl, cyclopropyl, cyclopropylmethyl, cyclobutyl, cyclobutylmethyl, cyclopentyl, cyclohexyl, cyclohexylmethyl, cycloheptyl, cyclooctyl, cyclohexylpropyl, cyclododecyl, norbornyl, bornyl, cis-myrtanyl, isopinocamphenyl, noradamantyl, adamantyl, adamantylmethyl, 1-(1-adamantyl)ethyl, 3,5-dimethyladamantyl, quinuclidinyl, cyclopentylethyl, and bicyclooctyl.

More preferred examples of the alkyl group having 1 to 21 carbon atoms represented by $R^1$ include methyl, ethyl, n-propyl, n-butyl, n-amyl, n-hexyl, n-heptyl, n-octyl, n-nonyl, n-decyl, n-undecyl, n-dodecyl, n-tridecyl, n-tetradecyl, isopropyl, sec-butyl, isobutyl, tert-butyl, 1-methylbutyl, 1-ethylpropyl, 2-methylbutyl, isoamyl, neopentyl, 1,2-dimethylpropyl, 1,1-dimethylpropyl, tert-amyl, 1,3-dimethylbutyl, 3,3-dimethylbutyl, 2-ethylbutyl, 2-ethyl-2-methylpropyl, straight-chain or branched heptyl, 1-methylheptyl, 2-ethylhexyl, 1,5-dimethylhexyl, tert-octyl, branched nonyl, branched decyl, branched undecyl, branched dodecyl, branched tridecyl, branched tetradecyl, cyclopropyl, cyclopropylmethyl, cyclobutyl, cyclobutylmethyl, cyclopentyl, cyclohexyl, cyclohexylmethyl, cycloheptyl, cyclooctyl, cyclohexylpropyl, cyclododecyl, norbornyl, bornyl, cis-myrtanyl, isopinocamphenyl, noradamantyl, adamantyl, adamantylmethyl, 1-(1-adamantyl)ethyl, 3,5-dimethyladamantyl, quinuclidinyl, cyclopentylethyl, and bicyclooctyl. Particularly preferred are methyl, ethyl, n-propyl, n-butyl, n-amyl, n-hexyl, n-heptyl, n-octyl, n-nonyl, n-decyl, isopropyl, sec-butyl, isobutyl, tert-butyl, 1-methylbutyl, 1-ethylpropyl, 2-methylbutyl, isoamyl, neopentyl, 1,2-dimethylpropyl, 1,1-dimethylpropyl, tert-amyl, 1,3-dimethylbutyl, 3,3-dimethylbutyl, 2-ethylbutyl, 2-ethyl-2-methylpropyl, straight-chain or branched heptyl, 1-methylheptyl, 2-ethylhexyl, 1,5-dimethylhexyl, tert-octyl, branched nonyl, branched decyl, cyclopropyl, cyclopropylmethyl, cyclobutyl, cyclobutylmethyl, cyclopentyl, cyclohexyl, cyclohexylmethyl, cycloheptyl, cyclooctyl, cyclohexylpropyl, cyclododecyl, norbornyl, bornyl, noradamantyl, adamantyl, adamantylmethyl, 1-(1-adamantyl)ethyl, 3,5-dimethyladamantyl, cyclopentylethyl, and bicyclooctyl.

In terms of improving heat resistance, particularly preferred examples of the above group include ethyl, n-propyl, n-butyl, n-amyl, n-hexyl, n-heptyl, n-octyl, n-nonyl, n-decyl, and branched or cyclic alkyl groups such as isopropyl, sec-butyl, isobutyl, tert-butyl, 1-methylbutyl, 1-ethylpropyl, 2-methylbutyl, isoamyl, neopentyl, 1,2-dimethylpropyl, 1,1-dimethylpropyl, tert-amyl, 1,3-dimethylbutyl, 3,3-dimethylbutyl, 2-ethylbutyl, 2-ethyl-2-methylpropyl, branched heptyl, 1-methylheptyl, 1,5-dimethylhexyl, tert-octyl, branched nonyl, branched decyl, cyclopropyl, cyclopropylmethyl, cyclobutyl, cyclobutylmethyl, cyclopentyl, cyclohexyl, cyclohexylmethyl, cycloheptyl, cyclooctyl, cyclohexylpropyl, cyclododecyl, norbornyl, bornyl, noradamantyl, adamantyl, adamantylmethyl, 1-(1-adamantyl)ethyl, 3,5-dimethyladamantyl, cyclopentylethyl, and bicyclooctyl.

The alkyl represented by $R^1$ may contain an ether group, and preferred examples thereof include tetrahydrofurfuryl, tetrahydropyranylmethyl, and 2,5-dihydro-2,5-dimethoxyfurfuryl.

The alkyl represented by $R^1$ may be fluorine-substituted alkyl. Preferred examples of the fluorine-substituted alkyl include trifluoromethyl, trifluoroethyl, pentafluoroethyl, heptafluoropropyl, nonafluorobutyl, tridecafluorohexyl, pentadecafluoroheptyl, heptadecafluorooctyl, tridecafluorooctyl, nonadecafluorononyl, heptadecafluorodecyl, and perfluorodecyl. More preferred are trifluoromethyl, pentafluoroethyl, heptafluoropropyl, nonafluorobutyl, tridecafluorohexyl, and pentadecafluoroheptyl. Particularly preferred are trifluoromethyl, pentafluoroethyl, heptafluoropropyl, nonafluorobutyl, and tridecafluorohexyl.

In the formula (I), the alkoxy group having 1 to 21 carbon atoms represented by $R^1$ may have any substituent, and $R^1$ is more preferably alkoxy having 1 to 15 carbon atoms.

The above alkyl represented by $R^1$ is preferably coupled to an oxygen atom to form the alkoxy group having 1 to 21 carbon atoms represented by $R^1$ (an alkyloxy group). The preferred range of the alkoxy corresponds to the above preferred range of the alkyl.

In the formula (I), the electron-attractive group is not particulary limited as long as it is electron-attractive.

Any group having a positive Hammett a value, as described in Naoki Inamoto, "Hammett Rule: Kozo to Hannosei (Structure and Reactivity)," Maruzen, Co., Ltd., may be the electron-attractive group represented by $R^1$. Preferred examples of such an electron-attractive group include ethynyl, trifluoromethyl, cyano, formyl, acyl, carboxyl, alkoxycarbonyl, aryloxycarbonyl, nitro, acetoxy, mercapto, alkylthio, alkylsulfinyl, substituted sulfonyl (such as alkylsulfonyl and arylsulfonyl), sulfamoyl, alkylsulfamoyl, arylsulfamoyl, acylthio, fluoro, chloro, bromo, and iodo. More preferred are ethynyl, trifluoromethyl, cyano, acyl, carboxyl, alkoxycarbonyl, aryloxycarbonyl, nitro, acetoxy, alkylthio, alkylsulfinyl, alkylsulfonyl, arylsulfonyl and the like, sulfamoyl, substituted sulfamoyl (such as alkylsulfamoyl and arylsulfamoyl), fluoro, chloro, bromo, and iodo. Particularly preferred are trifluoromethyl, cyano, acyl, carboxyl, alkoxycarbonyl, aryloxycarbonyl, nitro, acetoxy, alkylthio, alkylsulfinyl, alkylsulfonyl, arylsulfonyl and the like, sulfamoyl, substituted sulfamoyl (such as alkylsulfamoyl and arylsulfamoyl), fluoro, chloro, and bromo.

Any of these electron-attractive groups may have any of the substituents as shown above or any other substituent such as acyl, acylamino, acylaminocarbonylamino, aralkylaminocarbonylamino, arylaminocarbonylamino, methacryloylaminocarbonylamino, trifluoromethyl, fluoro, chloro, bromo, iodo, hydroxyl, nitro, methyl, ethyl, n-propyl, isopropyl, n-butyl, isobutyl, sec-butyl, tert-butyl, pentyl, hexyl, heptyl, octyl, vinyl, methoxyl, ethoxyl, butoxyl, isopropoxyl, tert-butoxyl, cyclohexyloxy, vinyloxy, phenyloxy, methylthio, ethylthio, pyrrolidinyl, piperidinyl, amino, dimethylamino, diethylamino, and phenyl.

A substituted or unsubstituted sulfamoyl group represented by the following formula (II) is one of the preferred examples of the electron-attractive group represented by $R^1$.

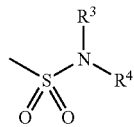

Formula (II)

wherein $R^3$ and $R^4$ each independently represent a hydrogen atom, alkyl group having 1 to 21 carbon atoms, alkenyl having 2 to 21 carbon atoms, aryl having 6 to 21 carbon atoms, or aralkyl having 7 to 21 carbon atoms; and $R^3$ and $R^4$ may each have any substituent; or $R^3$ and $R^4$ may combine with a substituted nitrogen atom to form a heterocycle.

In the formula (II), the alkyl group having 1 to 21 carbon atoms represented by $R^3$ or $R^4$ may have any substituent, and $R^3$ or $R^4$ is preferably alkyl having 1 to 15 carbon atoms.

The alkyl group having 1 to 21 carbon atoms represented by $R^3$ or $R^4$ may be straight-chain or branched alkyl or cyclic alkyl. Preferred examples of the alkyl include methyl, ethyl, n-propyl, n-butyl, n-amyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosanyl, isopropyl, sec-butyl, isobutyl, tert-butyl, 1-methylbutyl, 1-ethylpropyl, 2-methylbutyl, isoamyl, neopentyl, 1,2-dimethylpropyl, 1,1-dimethylpropyl, tert-amyl, 1,3-dimethylbutyl, 3,3-dimethylbutyl, 2-ethylbutyl, 2-ethyl-2-methylpropyl, straight-chain or branched heptyl, 1-methylheptyl, 2-ethylhexyl, 1,5-dimethylhexyl, tert-octyl, branched nonyl, branched decyl, branched undecyl, branched dodecyl, branched tridecyl, branched tetradecyl, branched pentadecyl, branched hexadecyl, branched heptadecyl, branched octadecyl, straight-chain or branched nonadecyl, straight-chain or branched eicosanyl, cyclopropyl, cyclopropylmethyl, cyclobutyl, cyclobutylmethyl, cyclopentyl, cyclohexyl, cyclohexylmethyl, cycloheptyl, cyclooctyl, cyclohexylpropyl, cyclododecyl, norbornyl, bornyl, cis-myrtanyl, isopinocamphenyl, noradamantyl, adamantyl, adamantylmethyl, 1-(1-adamantyl)ethyl, 3,5-dimethyladamantyl, quinuclidinyl, cyclopentylethyl, and bicyclooctyl.

More preferred examples of the alkyl group having 1 to 21 carbon atoms represented by $R^3$ or $R^4$ include methyl, ethyl, n-propyl, n-butyl, n-amyl, n-hexyl, n-heptyl, n-octyl, n-nonyl, n-decyl, n-undecyl, n-dodecyl, n-tridecyl, n-tetradecyl, isopropyl, sec-butyl, isobutyl, tert-butyl, 1-methylbutyl, 1-ethylpropyl, 2-methylbutyl, isoamyl, neopentyl, 1,2-dimethylpropyl, 1,1-dimethylpropyl, tert-amyl, 1,3-dimethylbutyl, 3,3-dimethylbutyl, 2-ethylbutyl, 2-ethyl-2-methylpropyl, straight-chain or branched heptyl, 1-methylheptyl, 2-ethylhexyl, 1,5-dimethylhexyl, tert-octyl, branched nonyl, branched decyl, branched undecyl, branched dodecyl, branched tridecyl, branched tetradecyl, cyclopropyl, cyclopropylmethyl, cyclobutyl, cyclobutylmethyl, cyclopentyl, cyclohexyl, cyclohexylmethyl, cycloheptyl, cyclooctyl, cyclohexylpropyl, cyclododecyl, norbornyl, bornyl, cis-myrtanyl, isopinocamphenyl, noradamantyl, adamantyl, adamantylmethyl, 1-(1-adamantyl)ethyl, 3,5-dimethyladamantyl, quinuclidinyl, cyclopentylethyl, and bicyclooctyl. Particularly preferred are methyl, ethyl, n-propyl, n-butyl, n-amyl, n-hexyl, n-heptyl, n-octyl, n-nonyl, n-decyl, isopropyl, sec-butyl, isobutyl, tert-butyl, 1-methylbutyl, 1-ethylpropyl, 2-methylbutyl, isoamyl, neopentyl, 1,2-dimethylpropyl, 1,1-dimethylpropyl, tert-amyl, 1,3-dimethylbutyl, 3,3-dimethylbutyl, 2-ethylbutyl, 2-ethyl-2-methylpropyl, straight-chain or branched heptyl, 1-methylheptyl, 2-ethylhexyl, 1,5-dimethylhexyl, tert-octyl, branched nonyl, branched decyl, cyclopropyl, cyclopropylmethyl, cyclobutyl, cyclobutylmethyl, cyclopentyl, cyclohexyl, cyclohexylmethyl, cycloheptyl, cyclooctyl, cyclohexylpropyl, cyclododecyl, norbornyl, bornyl, noradamantyl, adamantyl, adamantylmethyl, 1-(1-adamantyl)ethyl, 3,5-dimethyladamantyl, cyclopentylethyl, and bicyclooctyl.

In terms of improving heat resistance, particularly preferred examples of the above group include ethyl, n-propyl, n-butyl, n-amyl, n-hexyl, n-heptyl, n-octyl, n-nonyl, n-decyl, and branched or cyclic alkyl groups such as isopropyl, sec-butyl, isobutyl, tert-butyl, 1-methylbutyl, 1-ethylpropyl, 2-methylbutyl, isoamyl, neopentyl, 1,2-dimethylpropyl, 1,1-dimethylpropyl, tert-amyl, 1,3-dimethylbutyl, 3,3-dimethylbutyl, 2-ethylbutyl, 2-ethyl-2-methylpropyl, branched heptyl, 1-methylheptyl, 1,5-dimethylhexyl, tert-octyl, branched nonyl, branched decyl, cyclopropyl, cyclopropylmethyl, cyclobutyl, cyclobutylmethyl, cyclopentyl, cyclohexyl, cyclohexylmethyl, cycloheptyl, cyclooctyl, cyclohexylpropyl, cyclododecyl, norbornyl, bornyl, noradamantyl, adamantyl, adamantylmethyl, 1-(1-adamantyl)ethyl, 3,5-dimethyladamantyl, cyclopentylethyl, and bicyclooctyl.

In the formula (II), the alkyl represented by $R^3$ or $R^4$ may be fluorine-substituted alkyl. Preferred examples of the fluorine-substituted alkyl include trifluoromethyl, trifluoroethyl, pentafluoroethyl, heptafluoropropyl, nonafluorobutyl, tridecafluorohexyl, pentadecafluoroheptyl, heptadecafluorooctyl, tridecafluorooctyl, nonadecafluorononyl, heptadecafluorodecyl, and perfluorodecyl. More preferred are trifluoromethyl, pentafluoroethyl, heptafluoropropyl, nonafluorobutyl, tridecafluorohexyl, and pentadecafluoroheptyl. Particularly preferred are trifluoromethyl, pentafluoroethyl, heptafluoropropyl, nonafluorobutyl, and tridecafluorohexyl.

In the formula (II), the alkenyl group having 2 to 21 carbon atoms represented by $R^3$ or $R^4$ may have any substituent, and $R^3$ or $R^4$ is preferably alkenyl having 2 to 15 carbon atoms.

Preferred examples of the alkenyl group having 2 to 21 carbon atoms represented by $R^3$ or $R^4$ include vinyl, isopropenyl, 2-propenyl, 2-methyl-propenyl, 1-methyl-1-propenyl, 1-butenyl, 3-butenyl, 1-methyl-1-butenyl, 1,1-dimethyl-3-butenyl, 1-pentenyl, 2-pentenyl, 1-ethyl-1-pentenyl, 1-hexenyl, 1-heptenyl, 2,6-dimethyl-5-heptenyl, 9-decenyl, 1-cyclopentenyl, 2-cyclopentenylmethyl, cyclohexenyl, 1-methyl-2-cyclohexenyl, octenyl, citronellyl, oleyl, geranyl, farnesyl, and 2-(1-cyclohexenyl)ethyl. More preferred are vinyl, isopropenyl, 2-propenyl, 2-methyl-propenyl, 1-methyl-1-propenyl, 1-butenyl, 3-butenyl, 1-methyl-1-butenyl, 1,1-dimethyl-3-butenyl, 1-pentenyl, 2-pentenyl, 1-ethyl-1-pentenyl, 1-hexenyl, 1-heptenyl, 1-cyclopentenyl, 2-cyclopentenylmethyl, cyclohexenyl, and 1-methyl-2-cyclohexenyl. Particularly preferred are vinyl, isopropenyl, 2-propenyl, 2-methyl-propenyl, 1-methyl-1-propenyl, 1-butenyl, 3-butenyl, 1-methyl-1-butenyl, 1,1-dimethyl-3-butenyl, 1-pentenyl, 2-pentenyl, 1-ethyl-1-pentenyl, 1-hexenyl, 1-cyclopentenyl, 2-cyclopentenylmethyl, cyclohexenyl, and 1-methyl-2-cyclohexenyl.

The aryl group having 6 to 21 carbon atoms represented by $R^3$ or $R^4$ may have any substituent, and $R^3$ or $R^4$ is preferably aryl having 6 to 15 carbon atoms.

Preferred examples of the aryl group having 6 to 21 carbon atoms represented by $R^3$ or $R^4$ and optionally having a substituent include phenyl, naphthyl, biphenylenyl, acenaphthenyl, fluorenyl, anthracenyl, anthraquinonyl, and pyrenyl. More preferred are phenyl, naphthyl, biphenylenyl, acenaphthenyl, fluorenyl, and anthracenyl. Particularly preferred are phenyl, naphthyl, biphenylenyl, and fluorenyl.

The aralkyl group having 7 to 21 carbon atoms represented by $R^3$ or $R^4$ may have any substituent, and $R^3$ or $R^4$ is preferably aralkyl having 7 to 15 carbon atoms.

Preferred examples of the aralkyl group having 7 to 21 carbon atoms represented by $R^3$ or $R^4$ and optionally having a substituent include benzyl, diphenylmethyl, 1,2-diphenylethyl, phenyl-cyclopentylmethyl, α-methylbenzyl, phenylethyl, α-methyl-phenylethyl, β-methyl-phenylethyl, 3-phenylpropyl, 3,3-diphenylpropyl, 4-phenylbutyl, naphthylmethyl, styryl, cinnamyl, fluorenyl, 1-benzocyclobutenyl, 1,2,3,4-tetrahydronaphthyl, indanyl, piperonyl, and pyrenemethyl. More preferred are benzyl, phenyl-cyclopentylmethyl, α-methylbenzyl, phenylethyl, α-methyl-phenylethyl, β-methyl-phenylethyl, 3-phenylpropyl, 4-phenylbutyl, styryl, cinnamyl, fluorenyl, 1-benzocyclobutenyl, and 1,2,3,4-tetrahydronaphthyl. Particularly preferred are benzyl, α-methylbenzyl, phenylethyl, α-methyl-phenylethyl, β-methyl-phenylethyl, 3-phenylpropyl, styryl, cinnamyl, fluorenyl, 1-benzocyclobutenyl, and 1,2,3,4-tetrahydronaphthyl.

The alkyl, alkenyl, aryl, or aralkyl represented by $R^3$ or $R^4$ may contain an ether group, and preferred examples thereof include tetrahydrofurfuryl, tetrahydropyranylmethyl, and 2,5-dihydro-2,5-dimethoxyfurfuryl.

Examples of the heterocycle formed by $R^3$ and $R^4$ combining with the substituted nitrogen atom include 2-methylaziridine ring, azetidine ring, pyrrolidine ring, 3-pyrroline ring, piperidine ring, 1,2,3,6-tetrahydropyridine ring, hexamethyleneimine ring, piperazine ring, 1,3,3-trimethyl-6-azabicyclo[3.2.1]octane ring, decahydroquinoline ring, oxazolidine ring, morpholine ring, thiazolidine ring, thiomorpholine ring, indoline ring, isoindoline ring, 1,2,3,4-tetrahydrocarbazole ring, 1,2,3,4-tetrahydroquinoline ring, 1,2,3,4-tetrahydroisoquinoline ring, iminodibenzyl ring, phenoxazine ring, phenothiazine ring, and phenazine ring. More preferred are pyrrolidine ring, 3-pyrroline ring, piperidine ring, 1,2,3,6-tetrahydropyridine ring, hexamethyleneimine ring, piperazine ring, decahydroquinoline ring, oxazolidine ring, morpholine ring, thiazolidine ring, and thiomorpholine ring. Particularly preferred are pyrrolidine ring, 3-pyrroline ring, piperidine ring, 1,2,3,6-tetrahydropyridine ring, piperazine ring, decahydroquinoline ring, oxazolidine ring, morpholine ring, thiazolidine ring, and thiomorpholine ring.

In the formula (II), the alkyl, alkenyl, aryl, or aralkyl represented by $R^3$ or $R^4$ or the heterocycle formed of $R^3$, $R^4$ and the nitrogen atom. Examples of such a substituent include acyl, acylamino, acylaminocarbonylamino, aralkylaminocarbonylamino, arylaminocarbonylamino, methacryloylaminocarbonylamino, trifluoromethyl, fluoro, chloro, bromo, iodo, hydroxyl, nitro, methyl, ethyl, n-propyl, isopropyl, n-butyl, isobutyl, sec-butyl, tert-butyl, pentyl, hexyl, heptyl, octyl, vinyl, methoxyl, ethoxyl, butoxyl, isopropoxyl, tert-butoxyl, cyclohexyloxy, vinyloxy, methylthio, ethylthio, pyrrolidinyl, piperidinyl, amino, dimethylamino, diethylamino, and phenyl. More preferred are acyl (particularly acetyl), acylamino, trifluoromethyl, fluoro, chloro, bromo, hydroxyl, nitro, methyl, ethyl, n-propyl, isopropyl, n-butyl, isobutyl, sec-butyl, tert-butyl, pentyl, hexyl, vinyl, methoxyl, ethoxyl, butoxyl, isopropoxyl, tert-butoxyl, cyclohexyloxy, vinyloxy, methylthio, ethylthio, pyrrolidinyl, piperidinyl, amino, dimethylamino, diethylamino, and phenyl. Particularly preferred are acyl (especially acetyl), acylamino, trifluoromethyl, fluoro, chloro, bromo, hydroxyl, nitro, methyl, ethyl, n-propyl, isopropyl, n-butyl, isobutyl, tert-butyl, hexyl, vinyl, methoxyl, ethoxyl, isopropoxyl, cyclohexyloxy, vinyloxy, methylthio, ethylthio, pyrrolidinyl, piperidinyl, amino, dimethylamino, diethylamino, and phenyl. Any of these substituents may further have a substituent in the same manner.

Particularly when the substituent is an active hydrogen group such as hydroxyl and amino, the substituent may be allowed to react with any of a variety of acid chlorides, acid anhydrides, halides, or isocyanates so as to have a substituent such as acetyl, acyl, (meth)acryloyl, alkylaminocarbonyl or arylaminocarbonyl (such as butylaminocarbonyl and phenylaminocarbonyl), alkyl, and aralkyl.

The alkyl, alkenyl, aryl, or aralkyl represented by $R^3$ or $R^4$ or the heterocycle formed of $R^3$, $R^4$ and the nitrogen atom may further have a substituent represented by $R^3$ or $R^4$ as shown above.

In terms of color value, the total molecular weight of the groups represented by $R^3$ and $R^4$, is preferably 500 or less, more preferably 400 or less, particularly preferably 300 or less.

$R^3$ or $R^4$ preferably has 0 to 4 substituents, more preferably 0 to 3 substituents, particularly preferably 0 to 2 substituents.

In the formula (I), the group represented by $R^1$ may have a substituent. Examples of such a substituent include acyl, acylamino, acylaminocarbonylamino, aralkylaminocarbonylamino, arylaminocarbonylamino, methacryloylaminocarbonylamino, trifluoromethyl, fluoro, chloro, bromo, iodo, hydroxyl, nitro, methyl, ethyl, n-propyl, isopropyl, n-butyl, isobutyl, sec-butyl, tert-butyl, pentyl, hexyl, heptyl, octyl, vinyl, methoxyl, ethoxyl, butoxyl, isopropoxyl, tert-butoxyl, cyclohexyloxy, vinyloxy, methylthio, ethylthio, pyrrolidinyl, piperidinyl, amino, dimethylamino, diethylamino, and phenyl. More preferred are acyl (particularly acetyl), acylamino, trifluoromethyl, fluoro, chloro, bromo, hydroxyl, nitro, methyl, ethyl, n-propyl, isopropyl, n-butyl, isobutyl, sec-butyl, tert-butyl, pentyl, hexyl, vinyl, methoxyl, ethoxyl, butoxyl, isopropoxyl, tert-butoxyl, cyclohexyloxy, vinyloxy, methylthio, ethylthio, pyrrolidinyl, piperidinyl, amino, dimethylamino, diethylamino, and phenyl. Particularly preferred are acyl (particularly acetyl), acylamino, trifluoromethyl, fluoro, chloro, bromo, hydroxyl, nitro, methyl, ethyl, n-propyl, isopropyl, n-butyl, isobutyl, tert-butyl, hexyl, vinyl, methoxyl, ethoxyl, isopropoxyl, cyclohexyloxy, vinyloxy, methylthio, ethylthio, pyrrolidinyl, piperidinyl, amino, dimethylamino, diethylamino, and phenyl.

Any of these substituents may further have a substituent in the same manner.

Particularly when the substituent on the group represented by $R^1$ in the formula (I) is an active hydrogen group such as hydroxyl and amino, the substituent may be allowed to react with any of a variety of acid chlorides, acid anhydrides, halides, or isocyanates so as to have a substituent such as acetyl, acyl, (meth)acryloyl, alkylaminocarbonyl or arylaminocarbonyl (such as butylaminocarbonyl and phenylaminocarbonyl), alkyl, and aralkyl.

In terms of color value, the molecular weight of the group represented by $R^1$ in the formula (I) is preferably 700 or less, more preferably 600 or less, particularly preferably 500 or less.

In the formula (I), $R^2$ represents a cation having a charge equal to 1 valence of a cation of a metal atom having a valence of at least 2. $R^2$ is preferably $1/2Mg^+$, $1/2Ca^+$, $1/2Sr^+$, $1/2Ba^+$, $1/2Zn^+$, $1/3Al^+$, $1/2Cu^+$, $1/2Fe^+$, or the like, more preferably $1/2Mg^+$, $1/2Ca^+$, $1/2Ba^+$, $1/2Zn^+$, $1/3Al^+$, $1/2Cu^+$, or $1/2Fe^+$, particularly preferably $1/2Mg^+$, $1/2Ca^+$, $1/2Ba^+$, $1/2Zn^+$, $1/3Al^+$, or $1/2Cu^+$.

In the formula (I), n represents the number of the $R^1$ substituent(s). In the formula (I), n is from 0 to 5, preferably from 0 to 4, more preferably from 0 to 3, particularly preferably from 0 to 2.

The compound represented by the formula (I) may be used in combination with a compound that is represented by the formula (I) with $R^2$ replaced by a univalent metal cation or a cation of a nitrogen-containing compound.

In such a case, $R^2$ of formula (I) is preferably replaced by a cation of a hydrogen atom, Na, K, Rb, Cs, Ag, or a nitrogen-containing compound, more preferably by a cation of a hydrogen atom, Na, K, Rb, Ag, or a nitrogen-containing compound, particularly preferably by a cation of a hydrogen atom, Na, Ag, or a nitrogen-containing compound.

Examples of the nitrogen-containing compound include, but are not limited to, the following compounds:

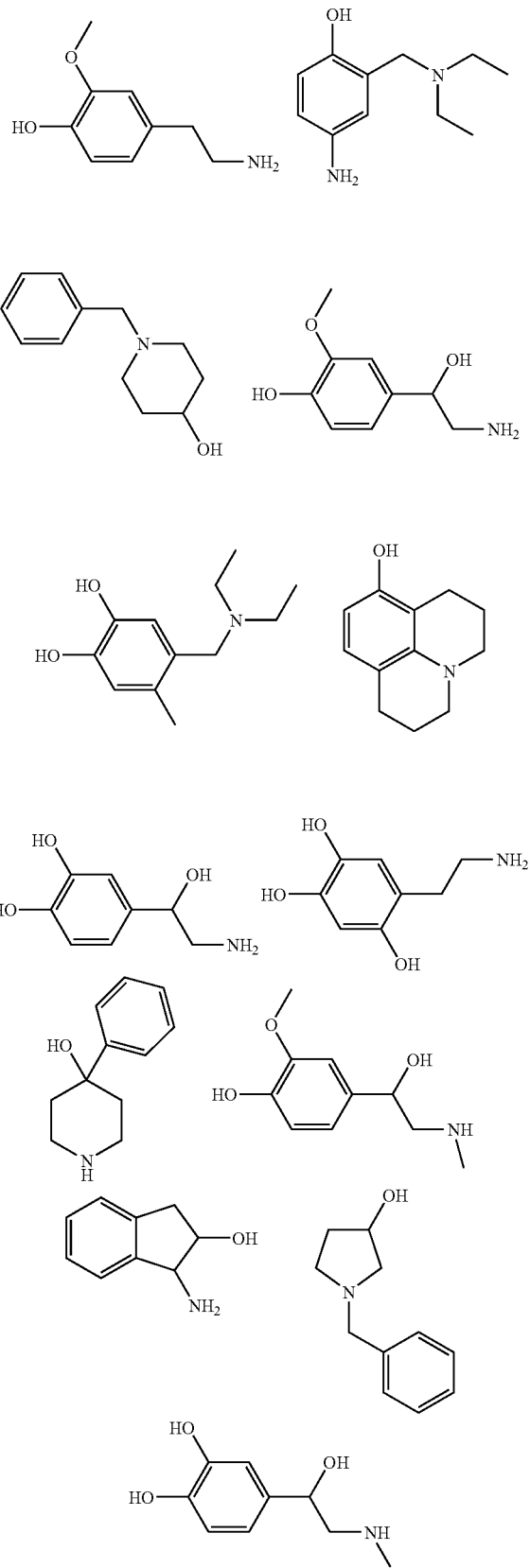

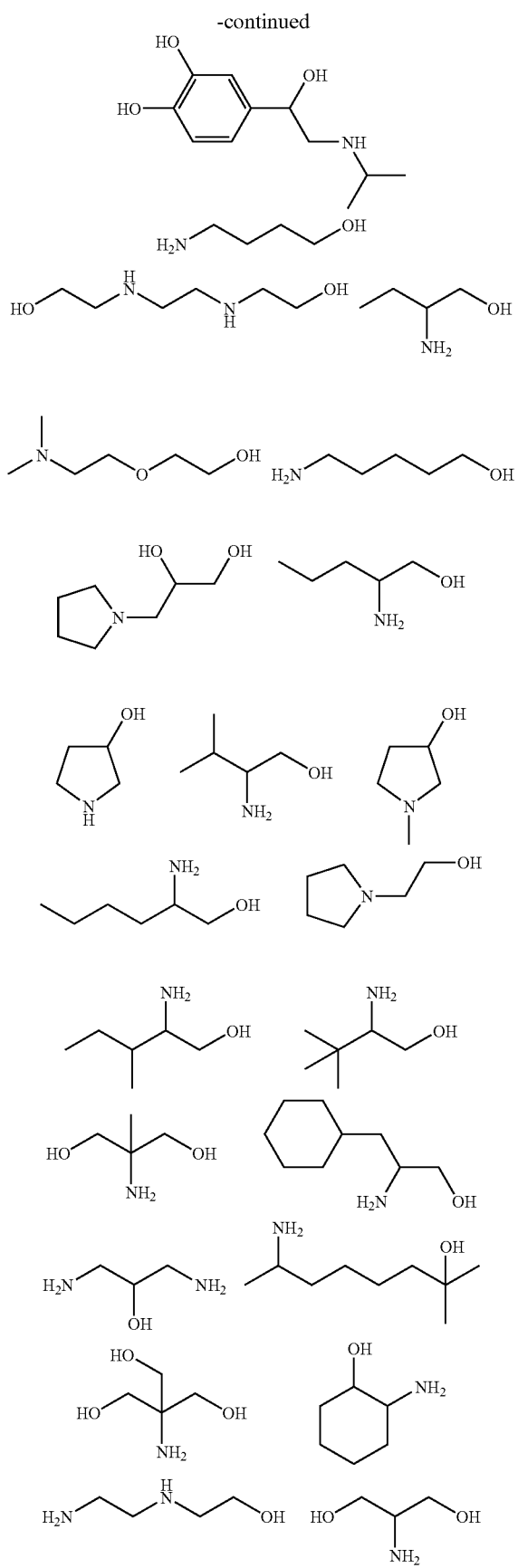
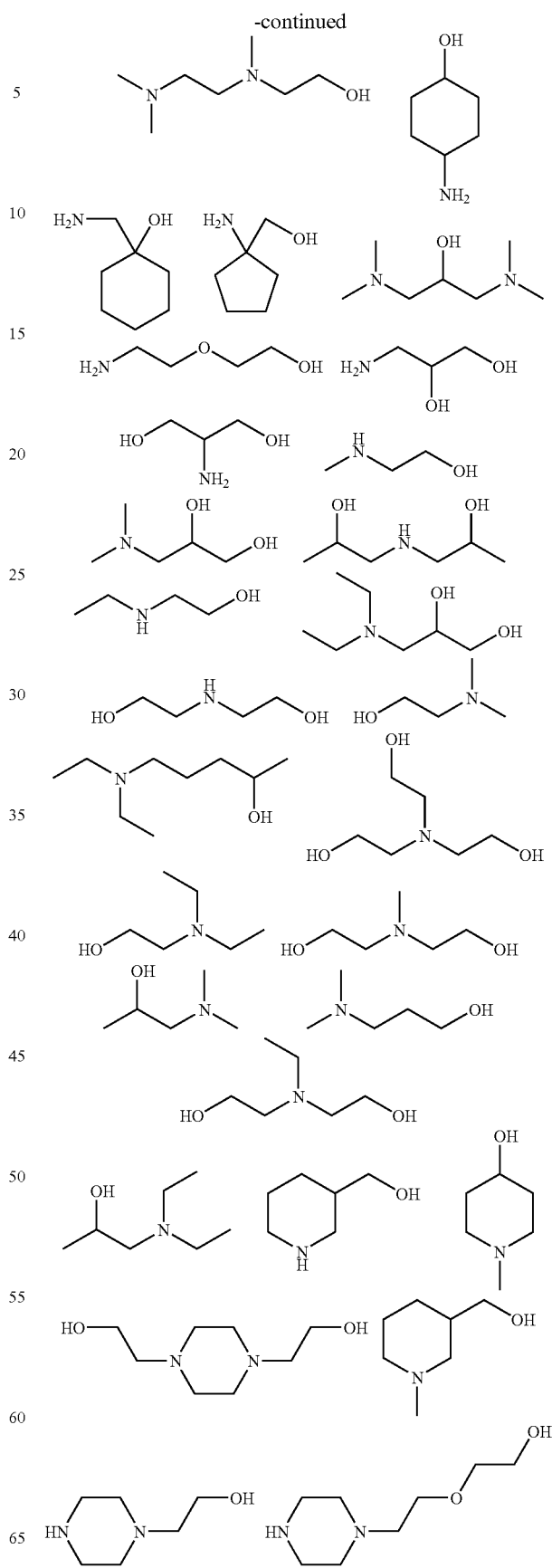

-continued
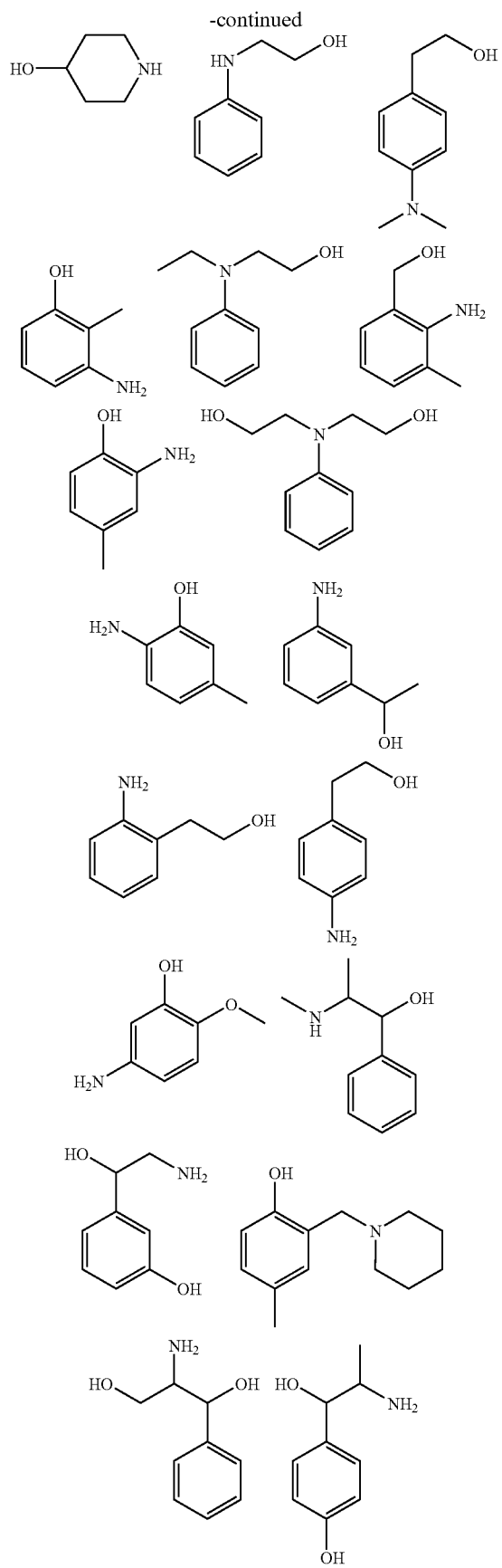
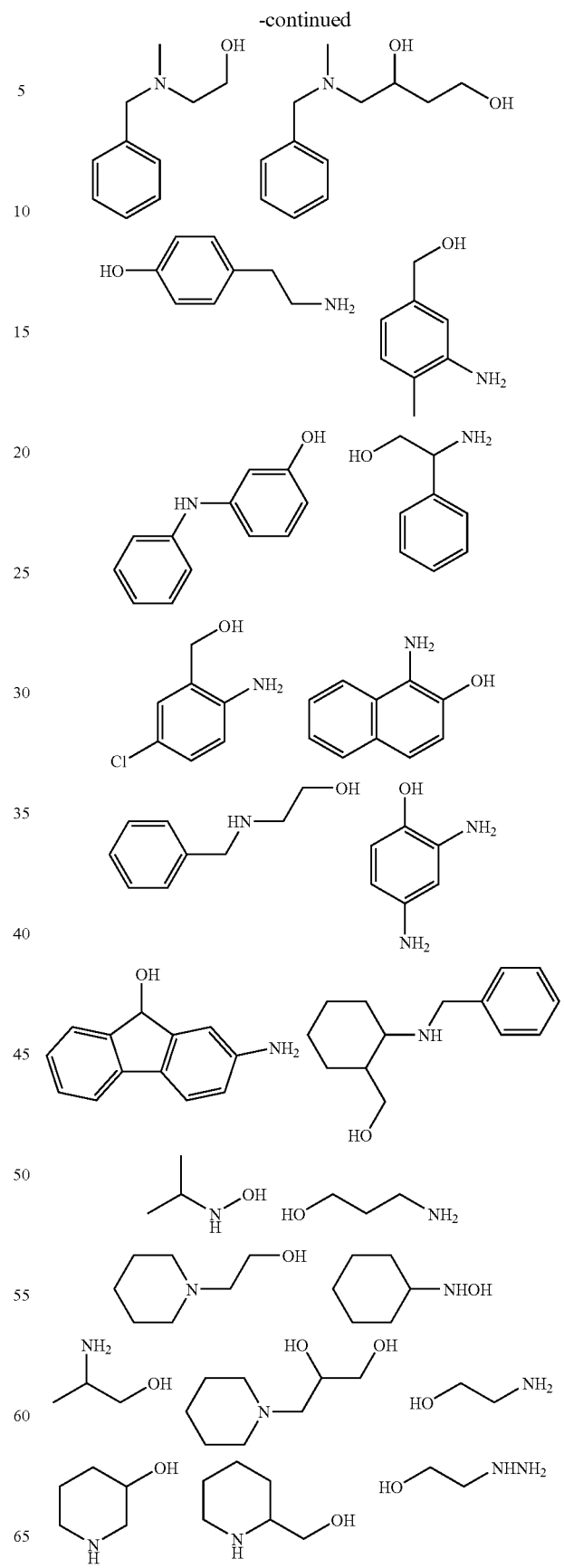

Specific examples of the compound represented by the formula (I) (Illustrative Compounds (1) to (16)) are shown below, but such examples are not intended to limit the scope of the invention.

(1)
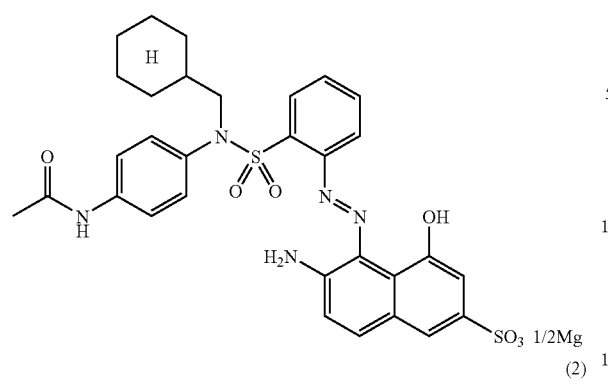
(2)
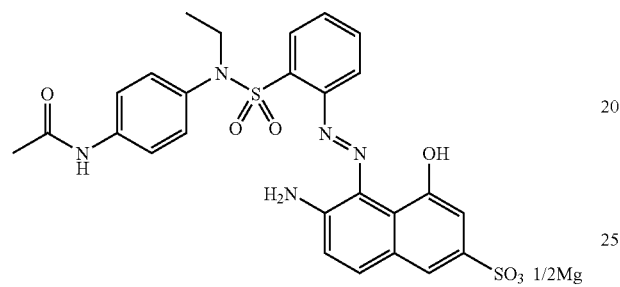
(3)
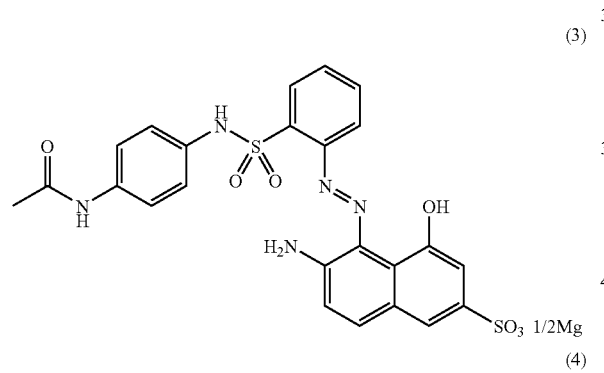
(4)
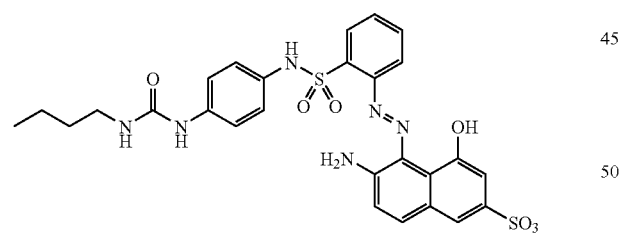
(5)
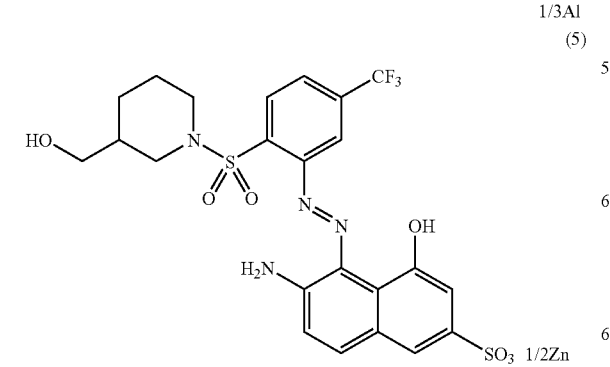
(6)
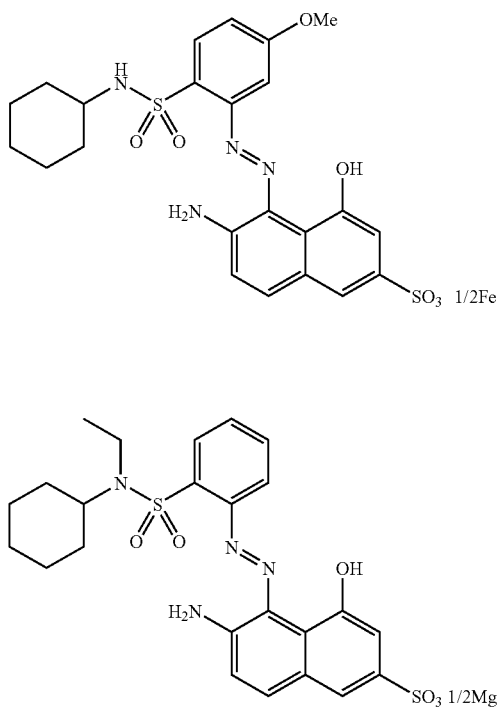
(7)
(8)
(9)
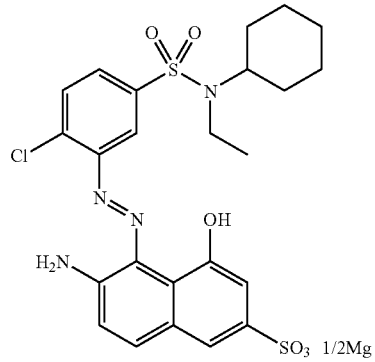
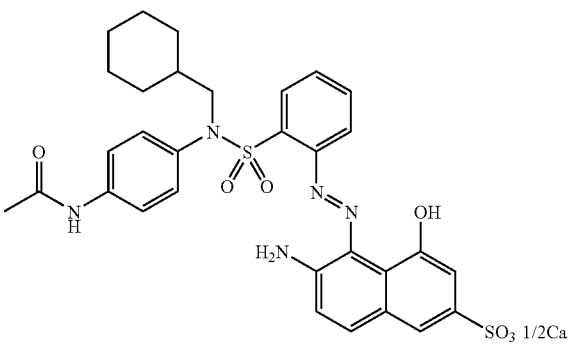

(10)
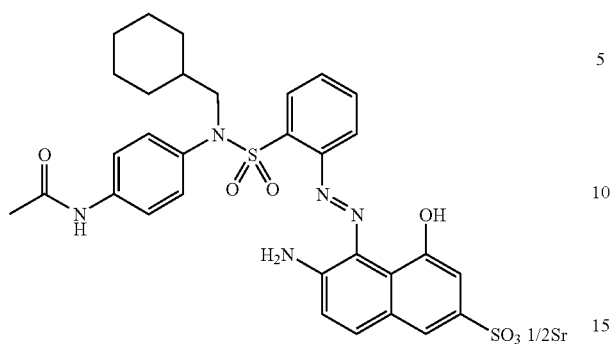

(11)
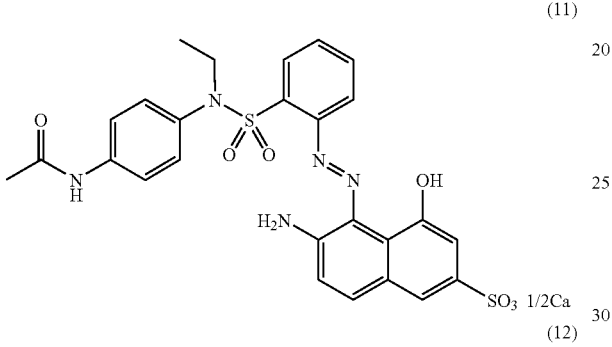

(12)
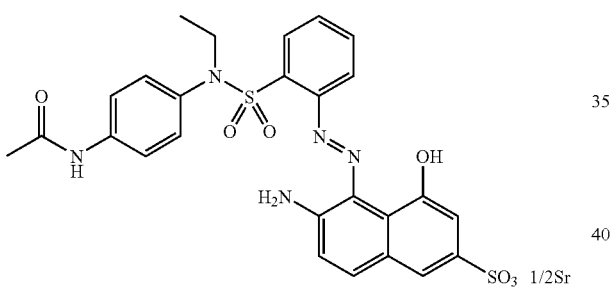

(13)
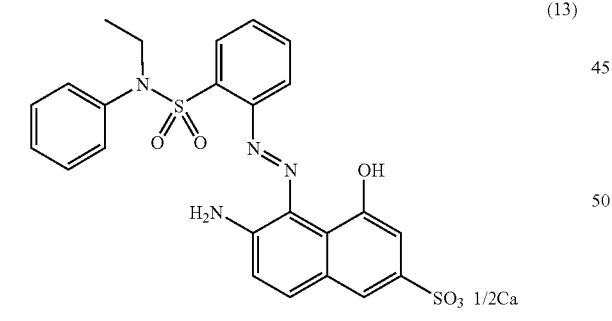

(14)
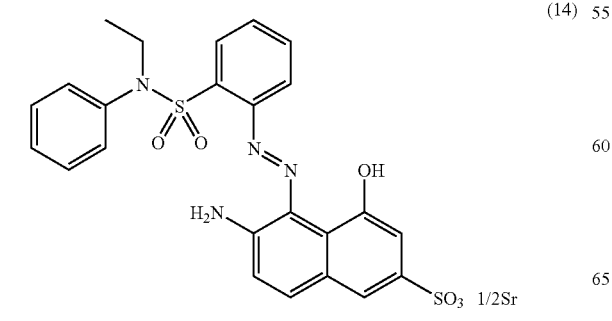

(15)
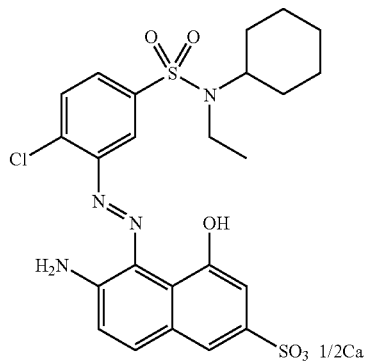

(16)
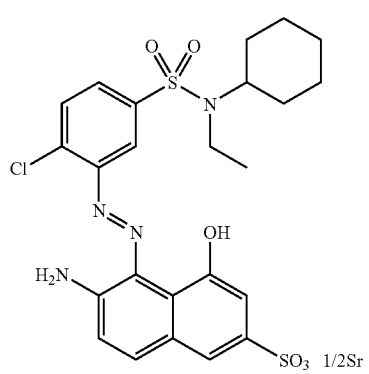

The colorant in the invention may be synthesized by any known general method. Such a general method of synthesizing the colorant in the invention is described below concerning above Illustrative Compound (1) as an example. However, such an example is not intended to limit the scope of the invention.

The illustrative Compound (1) may be produced according to the following Scheme 1

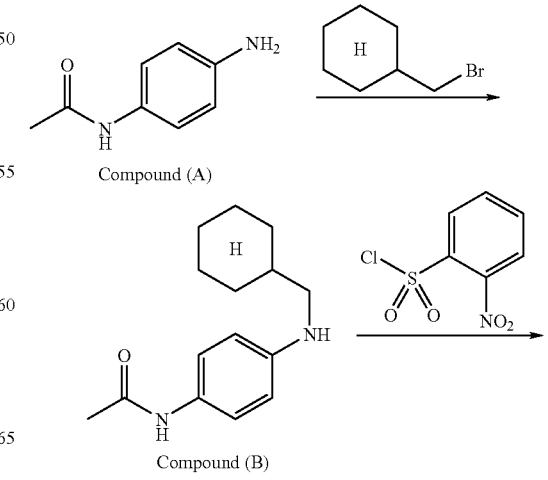

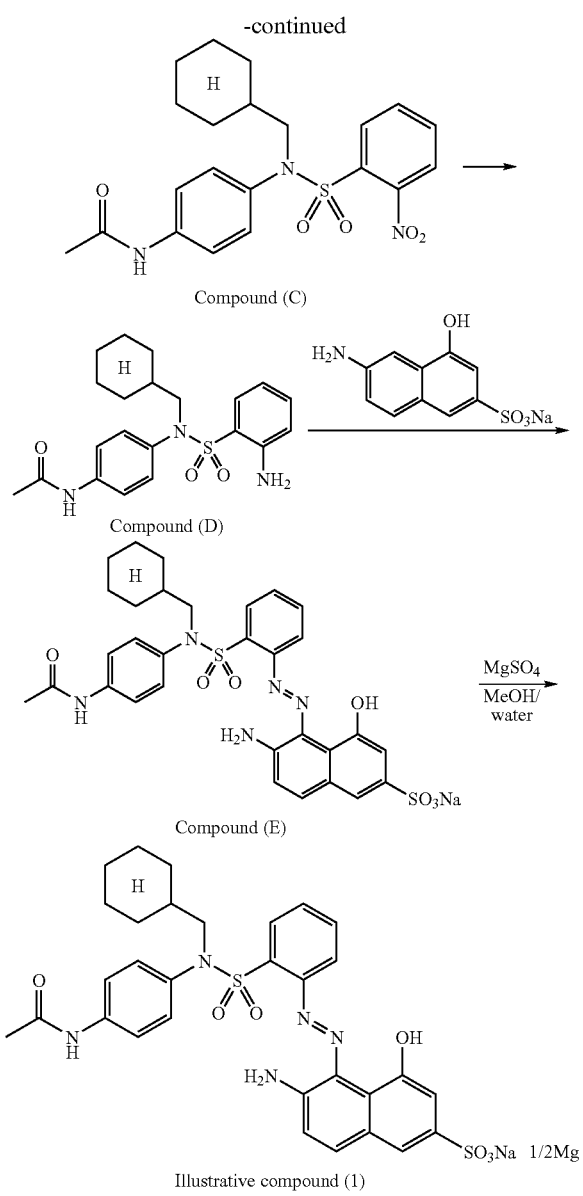

Compound (C)

Compound (D)

Compound (E)

Illustrative compound (1)

First, a mixture of Compound (A), cyclohexylmethyl bromide, dimethylformamide (DMF), and triethylamine is stirred at about 50° C. for several hours. The mixture is then poured into water and extracted with ethyl acetate. The resulting ethyl acetate phase is washed with water several times. Magnesium sulfate and activated carbon are then added to the ethyl acetate phase. After dried and decolorized, the ethyl acetate phase is filtered and condensed. Recrystallization from hexane/ethyl acetate is then performed so that Compound (B) is obtained.

Compound (B) is then gradually added to a solution of a mixture of o-nitrobenzenesulfonyl chloride and acetone, and the resulting mixture is heated. After an aqueous solution of 20% sodium carbonate is added dropwise thereto, the resulting mixture is stirred for about one hour and then heated and further stirred for about one hour. After the stirring, the mixture is poured into water and extracted with ethyl acetate. The resulting ethyl acetate phase is washed with an aqueous solution of 4% sulfuric acid. Magnesium sulfate and activated carbon are then added to the ethyl acetate phase. After dried and decolorized, the ethyl acetate phase is filtered and condensed so that Compound (C) is obtained.

A mixture of reduced iron, acetic acid and water is then stirred while heated. A dichlorobenzene solution of the resulting Compound (C) is then added dropwise to the mixture and stirred for several hours under heating. After the stirring, sodium carbonate is further added thereto and stirred for about 30 minutes under heating. Celite and activated carbon are then added and filtered out. The resulting organic phase is steam-distilled to give Compound (D).

A mixture of the resulting Compound (D), tetraethylammonium chloride, acetic acid, and 36% hydrochloric acid is cooled to about 0° C. After the cooling, an aqueous solution of sodium sulfite is added dropwise to the mixture while the inner temperature is kept at 5° C. or less, and stirring is performed while the temperature is kept at about 5 to 10° C.

The resulting solution is then added dropwise to a separately prepared aqueous alkali solution of γ acid, and an aqueous solution of 40% sodium acetate is further added dropwise thereto. Stirring is then performed at about 0° C. for several hours. After the stirring, an aqueous solution of 10% sodium carbonate is added dropwise thereto, and stirring is performed overnight. An aqueous solution of 50% NaOH is then added dropwise. The resulting mixture is stirred for about one hour under heating, and then cooled to room temperature. The mixture is then filtered and washed with alkaline brine so that Compound (E) was obtained.

The resulting Compound (E) is then dissolved in MeOH (methanol), and water is added to the resulting solution and stirred. After the stirring, $MgSO_4$ is added, further stirred and allowed to stand overnight. After ethyl acetate is added thereto, the $MgSO_4$ is removed by filtration. The resulting MeOH solution is condensed to give the illustrative Compound (1).

Any of the other illustrative compounds may also be synthesized using appropriately selected materials based on the above method.

In the invention, the colorant may be used in combination with any other acid dye, a salt of any other acid dye and a metal or a nitrogen-containing compound (in some cases, these materials are also generically referred to as "atomic group forming a salt with an acid dye"), or any other acid dye derivative.

Acid Dye

The following description will explain the acid dye. The acid dye is not particularly limited as long as it contains an acidic group of a sulfonic acid or a carboxylic acid, and is appropriately selected by taking into consideration all the necessary performances such as solubility with respect to an organic solvent and a developer, a salt-forming property, light absorbency, interaction with the other components in the composition, light resistance, and heat resistance.

The specific examples of the acid dye include the following. However, these examples should not be construed to limit the invention.

acid alizarin violet N;
acid black 1, 2, 24, 48;
acid blue 1, 7, 9, 15, 18, 23, 25, 27, 29, 40, 45, 62, 70, 74, 80, 83, 86, 87, 90, 92, 103, 112, 113, 120, 129, 138, 147, 158, 171, 182, 192;
acid chrome violet K;
acid Fuchsin;
acid green 1, 3, 5, 9, 16, 25, 27, 50;
acid orange 6, 7, 8, 10, 12, 50, 51, 52, 56, 63, 74, 95;

acid red 1, 4, 8, 14, 17, 18, 26, 27, 29, 31, 34, 35, 37, 42, 44, 50, 51, 52, 57, 66, 73, 80, 87, 88, 91, 92, 94, 97, 103, 111, 114, 129, 133, 134, 138, 143, 145, 150,151, 158, 176, 183, 198, 211, 215, 216, 217, 249, 252, 257, 260, 266, 274;

acid violet 6B, 7, 9, 17, 19;

acid yellow 1, 3, 7, 9, 11, 17, 23, 25, 29, 34, 36, 42, 54, 72, 73, 76, 79, 98, 99, 111, 112, 114, 116, 134, 172, 228, 38, 65, 220, 169, 243;

Food Yellow 3;

and derivatives of these dyes.

Among these acid dyes, more preferable examples are: acid black 24; acid blue 23, 25, 29, 62, 86, 87, 92, 138, 158; acid orange 8, 51, 56, 74, 63, 74; acid red 1, 4, 8, 34, 37, 42, 52, 57, 80, 97, 114, 143, 145, 151, 183, 217; acid violet 7; acid yellow 17, 25, 29, 34, 42, 72, 76, 99, 111, 112, 114, 116, 134, 172, 228, 38, 65, 220, 169, 243;and derivatives of these dyes.

Moreover, an azo-type acid dye, a xanthene-type acid dye or a phthalocyanine-type acid dye other than the above-mentioned dyes is preferably used, and preferable examples thereof include acid dyes such as C. I. Solvent Blue 44, 38, C. I. Solvent Orange 45, Rhodamine B, Rhodamine 110, 2, 7-Naphthalenedisulfonic acid and 3-[(5-chloro-2-phenoxyphenyl) hydrazono]-3,4-dihydro-4-oxo-5-[(phenylsulfonyl) amino]-, and derivatives of these dyes. As derivatives of the acid dyes, compounds obtained by converting a sulfonic acid of an acid dye to a sulfonamide or a sulfonate can be preferably used.

Atomic Group Forming a Salt with an Acid Dye

The atomic group forming a salt with an acid dye is not particularly limited as long as it is cationic and capable of forming a salt with an anion of the acid dye and it includes, for example, of the cations of hydrogen atom, Na, K, Rb, Cs, and a nitrogen-containing compound.

The nitrogen-containing compound for forming a salt with an acid dye may be selected in consideration of all of the necessary performances such as the solubility in an organic solvent and a developer to be employed for the composition preparation and development treatment, salt formability, absorbance of a dye, compatibility with other components of the curable composition, and the like. In the case the compound is selected from a viewpoint of only the absorbance, those having a molecular weight as low as possible are preferable and those having a molecular weight of 245 or less are more preferable: those having a molecular weight of 240 or less are particularly preferable: and those having a molecular weight of 230 or less are especially preferable.

Also, a nitrogen-containing compound commonly known as an anti-fading agent may be used for the purpose of light-fading prevention and heat resistance improvement of a dye and from this point, a compound having a lower oxidation potential (lower ionization potential), a tertiary amine compound, an aliphatic cyclic amine compound, an aniline type compound, a hydrazine type compound and the like are preferable.

Specific examples of preferable nitrogen-containing compounds are same as the above nitrogen-containing.

Next, the mole ratio (=m) of (atomic group forming salt with acid dye)/(acid dye) in the above-mentioned acid dye will be descried. The reference character "m" is a value determining the mole ratio of the atomic group which is a counter-ion of the acid dye molecule and can be selected optionally depending on the salt formation condition of the atomic group-acid dye. Specifically, n is a numeric value within a number of the functional groups of the acid of the acid dye and satisfies 0<m<10 and may properly be selected in consideration of an order of preference of all the required performances, such as solubility in an organic solvent or a developer, salt-forming performance, absorbance, interaction with other components of a curable composition, light fastness, heat resistance, and the like. In the case the numeric value is selected from a viewpoint of only the absorbance, n is preferably in a range 0<m≦7; more preferably 0<m≦6, and particularly preferably 0<m≦5.

Although it differs depending on the type of the colorant, the total concentration of the colorant in the invention is preferably 0.5 to 80% by mass, more preferably 0.5 to 60% by mass, and particularly preferably 0.5 to 50% by mass. When the content of the colorant is 0.5 to 80% by mass, the curability and development performance of the composition of the invention is improved.

Binder

Next the binder which can be preferably used will be described. The colorant-containing curable composition of the invention contains at least one kind of binder, and the binder is not particularly limited as long as it is alkali-soluble, and is preferably selected in consideration of heat resistance, developing property, and availability.

Preferable the alkali-soluble binder is linear organic high molecular weight polymers which are soluble in an organic solvent and developable in an aqueous weakly alkaline solution. Examples of such linear organic high molecular weight polymers may include polymers having carboxylic acid in the side chains such as methacrylic acid copolymers, acrylic acid copolymers, itaconic acid copolymers, crotonic acid copolymers, maleic acid copolymers, partially esterified maleic acid copolymers and the like described in JP-A No. 59-44615, Japanese Patent Application Publication (JP-B) Nos. 54-34327, 58-12577, and 54-25957, and JP-A Nos. 59-53836 and 59-71048. Also, acidic cellulose derivatives having carboxylic acid in the side chain are preferably used.

Other than the above-mentioned polymers, polymers obtained by adding acid anhydrides to polymers having hydroxy groups, polyhydroxystyrene type resins, polysiloxane type resins, poly(2-hydroxyethyl(meth)acrylate), polyvinylpyrrolidone, polyethylene oxide, and poly(vinyl alcohol) are also useful.

Further, monomers having hydrophilicity may be copolymerized and examples of such monomers are alkoxyalkyl (meth)acrylate, hydroxyalkyl (meth)acrylate, glycerol (meth)acrylate, (meth)acrylamide, N-methylolacrylamide, secondary or tertiary alkylacrylamide, dialkylaminoalkyl (meth)acrylate, morpholine (meth)acrylate, N-vinylpyrrolidone, N-vinylcaprolactam, vinylimidazole, vinyltriazole, methyl (meth)acrylate, ethyl (meth)acrylate, branched or straight chain propyl (meth)acrylate, branched or straight chain butyl (meth)acrylate, phenoxyhydroxypropyl (meth)acrylate, and the like.

Additionally, examples of the above-mentioned monomers having hydrophilicity also include monomers having tetrahydrofurfuryl group, phosphoric acid, phosphoric ester, quaternary ammonium salts, ethyleneoxy chain, propylene oxy chain, sulfonic acid and salts thereof, and morpholinoethyl group.

Further, the alkali-soluble binder may have polymerizable groups in the side chains for improving the cross-linking efficiency and polymers having allyl group, (meth)acryl group, allyloxyalkyl group and the like in the side chains are also usable.

Hereinafter, polymers having these polymerizable groups will be exemplified, however they are not particularly limited to the following examples so long as they contain alkali-soluble groups such as COOH, OH and ammonium and unsaturated bonds between carbon atoms.

As specific examples, compounds obtained by reaction of a compound having epoxy ring reactive on OH group and an unsaturated bond between carbon atoms (e.g. glycidyl acrylate) with a copolymer of an OH-group-containing monomer, e.g. 2-hydroxyethyl acrylate, a COOH-containing monomer, e.g. methacrylic acid, and a monomer of an acrylic or vinyl compound copolymerizable with these monomers can be used.

Those reactive on OH group may include compounds having acid anhydride, isocyanate group, or acryloyl, other than epoxy ring. Also, reaction products obtained by reaction of a saturated or unsaturated polybasic acid anhydride with a compound obtained by reaction of an unsaturated carboxylic acid such as acrylic acid with a compound having an epoxy ring as described JP-A No. 6-102669 and 6-1938 can be used.

Examples of the compound having alkali-soluble group such as COOH and an unsaturated bond between carbon atoms are Dianal NR series (manufactured by Mitsubishi Rayon Co., Ltd.); Photomer 6173 (COOH-containing Polyurethane Acrylic Oligomer manufactured by Daimond Shamrock Co., Ltd.); Viscoat R-264 and KS resist 106 (manufactured by Osaka Organic Chemical Industry Co., Ltd.); Cyclomer P series and Placcel CF 200 series (manufactured by Daicel Chem. Ind., Ltd.); and Ebecryl 3800 (manufactured by Daicel UCB Co., Ltd.).

Among the these alkali-soluble binder, from a viewpoint of heat resistance, polyhydroxystyrene type resins, polysiloxane type resins, acrylic resins, acrylamide type resins, and acryl/acrylamide copolymer resins are preferable and acrylic resins, polyhydroxystyrene type resins, and polysiloxane type resins are further preferable. Also, from a viewpoint of developing property controlling, acrylic resins, acrylamide type resins, and acryl/acrylamide copolymer resins are preferable.

Preferable examples of the acrylic resins include copolymers made from monomers selected from the group consisting of benzyl (meth)acrylate, (meth)acrylic acid, hydroxyethyl (meth)acrylate, and (meth)acrylamide; Cyclomer P series and Placcel CF 200 series (manufactured by Daicel Chem. Ind., Ltd.); Ebecryl 3800 (manufactured by Daicel UCB Co., Ltd.); Dianal NR series (manufactured by Mitsubishi Rayon Co., Ltd.); and Viscoat R-264 and KS resist 106 (manufactured by Osaka Organic Chemical Industry Co., Ltd.).

Also, to improve the strength of a cured coating, alcohol-soluble nylons and polyethers of 2,2-bis(4-hydroxyphenyl) propane and epichlorohydrin are also useful.

Further, alkali-soluble phenol resins may be used. The alkali-soluble phenol resins can be used preferably when constituting the composition of the invention into a positive-type structure. Examples of alkali-soluble phenol resins include novolak resins and vinyl polymers.

Examples of the novolak resins include products obtained by condensation reaction of phenols and aldehydes in the presence of an acid catalyst. Examples of the phenols are phenol, cresol, ethylphenol, butylphenol, xylenol, phenylphenol, catechol, resorcinol, pyrogallol, naphthol and bisphenol A. These phenols may be used alone or in combination of two or more of them. Examples of the aldehydes are formaldehyde, paraformaldehyde, acetaldehyde, propionaldehyde, and benzaldehyde.

Specific examples of the novolak resins are condensation products of m-cresol, p-cresol and their mixture with formalin. The novolak resins may be adjusted to have controlled molecular weight distribution by using a means such as fluctuation. Also, low molecular weight components having phenolic hydroxyl such as bisphenol C and bisphenol A may be added to the novolak resins.

In the invention, preferred is (meth)acryl type alkali-soluble polymer. More preferred is (meth)acryl type alkali-soluble polymer having polymerizable group in a side chain a part bonded to the main chain.

The weigh average molecular weight (the value on the basis of polystyrene measured by GPC method) of polymers as the above-mentioned binder is preferably 1,000 to $2\times10^5$, more preferably 2,000 to $1\times10^5$, and particularly preferably 5,000 to $5\times10^4$.

The content of the above-mentioned binder in the colorant-containing curable composition is preferably 10 to 90% by mass, more preferably 20 to 80% by mass, and particularly preferably 30 to 70% by mass in the entire solid components of the composition. When the content of the binder is 10 to 90% by mass, the curability and development performance of the composition of the invention is improved.

Cross-Linking Agent

Next, a cross-linking agent which can be used in the invention will be described below. The composition of the invention contains the above mentioned colorant in the invention (preferably the above mentioned an organic solvent-soluble dye represented by formula (I)) can promote a curing reaction of a coated layer to a higher degree than a convention composition so as to obtain a layer with good excellent curability. Additional use of a cross-linking agent makes it possible to form a layer that is cured to an even greater extent.

In the invention, it is possible to obtain a layer that is cured to a higher degree by additionally using a cross-linking agent.

The cross-linking agent to be applied to the invention is not particularly limited as long as it carries out a layer curing process through a cross-linking reaction. Examples thereof include (a) epoxy resin, (b) a melamine compound, a guanamine compound, a glycol uryl compound or an urea compound that is substituted by at least one substituent selected from the group consisting of a methylol group, an alkoxymethyl group and an acyloxymethyl group, and (c) a phenol compound, a naphthol compound or a hydroxyl anthracene that is substituted by at least one substituent selected from the group consisting of a methylol group, an alkoxymethyl group and an acyloxymethyl group. Among these, polyfunctional epoxy resin is preferably used.

As (a) epoxy resin, any resin may be used as long as it has an epoxy group and a cross-linking property. Examples thereof include divalent glycidyl group-containing low molecular compounds, such as bisphenol A diglycidyl ether, ethylene glycol diglycidyl ether, butane diol diglycidyl ether, hexane diol diglycidyl ether, dihydroxy biphenyl diglycidyl ether, phthalic acid diglycidyl ester and N,N-diglycidyl aniline; also trivalent glycidyl group-containing low molecular compounds, such as trimethylol propane triglycidyl ether, trimethylol phenol triglycidyl ether, TrisP-PA triglycidyl ether, also tetravalent glycidyl group-containing low molecular compounds, such as pentaerythritol tetraglycidyl ether and tetramethylol bisphenol A tetraglycidyl ether; also polyvalent glycidyl group-containing low molecular compounds, such as dipentaerythritol pentaglycidyl ether and dipentaerythritol hexa glycidyl ether; and also glycidyl group-containing polymer compounds, such as polyglycidyl(meth) acrylate and 1,2-epoxy-4-(2-oxyranyl) cyclohexane adduct of 2,2-bis(hydroxymethyl)-1-butanol.

The number of substituting methylol group, alkoxy methyl group and acyloxy methyl group in the cross-linking agent (b) is 2 to 6 in the case of a melamine compound, and 2 to 4 in the case of a glycol uryl compound, a guanamine compound and an urea compound. More preferably, it is 5 to 6 in the case of a melamine compound, and 3 to 4 in the case of a glycol uryl compound, a guanamine compound and an urea compound.

The abovementioned methylol group-containing compound related to (b) is obtained by heating the alkoxy methyl group-containing compound related to (b) in alcohol in the presence of an acidic catalyst such as hydrochloric acid, sulfuric acid, nitric acid and methane sulfonic acid. The above-mentioned acyloxy methyl group-containing compound related to (b) is obtained by mixing and stirring the methylol group-containing compound related to (b) with acyl chloride in the presence of a basic catalyst.

Specific examples of compounds related to (b) having the above-mentioned substituent include the following.

Examples of the melamine compound include hexamethylol melamine, hexamethoxymethyl melamine and a compound in which 1 to 5 methylol groups of hexamethylol melamine are methoxy-methylated or mixtures thereof. Examples of the melamine compound also include hexamethoxy ethyl melamine, hexaacyloxy methyl melamine and a compound in which 1 to 5 methylol groups of hexamethylol melamine are acyloxy-methylated or mixtures thereof.

Examples of the above-mentioned guanamine compound include tetramethylol guanamine, tetramethoxy methyl guanamine and compounds in which 1 to 3 methylol groups of tetramethylol guanamine are methoxy-methylated or mixtures thereof, and tetramethoxy ethyl guanamine, tetraacyloxy methyl guanamine and compounds in which 1 to 3 methylol groups of tetramethylol guanamine are acyloxy-methylated or mixtures thereof.

Examples of the above-mentioned glycol uryl compound include tetramethylol glycol uryl, tetramethoxy methyl glycol uryl and compounds in which 1 to 3 methylol groups of tetramethylol glycol uryl are methoxy-methylated or mixtures thereof, and compounds in which 1 to 3 methylol groups of tetramethylol glycol uryl are acyloxy-methylated or mixtures thereof.

Examples of the above-mentioned urea compound include tetramethylol urea, tetramethoxy methyl urea and compounds in which 1 to 3 methylol groups of tetramethylol urea are methoxy-methylated or mixtures thereof, and tetramethoxy ethyl urea.

These compounds related to (b) may be used alone, or may be used in combination.

The above-mentioned cross-linking agent (c), that is, a phenol compound, a naphthol compound or a hydroxy anthracene compound which is substituted by at least one group selected from the group consisting of a methylol group, an alkoxy methyl group and an acyloxy methyl group, makes it possible to prevent inter-mixing with the uppercoat photoresist through thermal cross-linking, and also to further improve the layer strength in the same manner as the above-mentioned cross-linking agent (b).

With respect to a number of the at least one group selected from a methylol group, an acyloxy methyl group, and an alkoxy methyl group contained in the above-mentioned cross-linking agent (c), two groups are required per molecule at a minimum. From the viewpoint of thermal cross-linking property and storage stability, it is preferable to use a compound in which all the second and fourth positions of the phenol skeleton are substituted. Moreover, in naphthol skeleton and hydroxy anthracene skeleton, it is preferable that all the ortho position and para position of the OH group are substituted. The third position and the fifth position of the phenol compound may be substituted or unsubstituted.

Regarding the above-mentioned naphthol compound, positions other than the ortho position of the OH group may be substituted or unsubstitued.

The methylol group-containing compound related to (c) is obtained from the reaction between a compound, in which ortho position or para position (second position or fourth position) of a phenolic OH group is a hydrogen atom, as a raw material and formalin in the presence of a basic catalyst, such as sodium hydroxide, potassium hydroxide, ammonia and tetraalkyl ammonium hydroxide.

The alkoxy methyl group-containing compound related to (c) is obtained by heating the methylol group-containing compound related to (c) in alcohol in the presence of an acidic catalyst such as hydrochloric acid, sulfuric acid, nitric acid, and methane sulfonic acid.

The acyloxy methyl group-containing compound related to (c) is obtained from the reaction of the methylol group-containing compound related to (c) with acyl chloride in the presence of a basic catalyst.

Examples of the skeleton compound in the cross-linking agent (c) include a phenol compound, naphthol and a hydroxy anthracene compound in which the ortho position or para position of the phenolic OH group is unsubstituted. Specific examples thereof include phenol, the isomers of cresol, 2,3-xylenol, 2,5-xylenol, 3,4-xylenol, 3,5-xylenol, bisphenols such as bisphenol A, 4,4'-bishydroxy biphenyl, TrisP-PA (manufactured by Honshu Chemical Industry Co., Ltd.), naphthol, dihydroxy naphthalene and 2,7-dihydroxy anthracene.

Examples of the cross-linking agent (c) include trimethylol phenol, tri(methoxymethyl)phenol and compounds in which 1 to 2 methylol groups of trimethylol phenol are methoxy-methylated, trimethylol-3-cresol, tri(methoxymethyl)-3-cresol, compounds in which 1 to 2 methylol groups of trimethylol-3-cresol are methoxy-methylated, dimethylol cresol such as 2,6-dimethylol-4-cresol, tetramethylol bisphenol A, tetramethoxy methyl bisphenol A, compounds in which 1 to 3 methylol groups of tetramethylol bisphenol A are methoxy-methylated, tetramethylol-4,4'-bishydroxy biphenyl, tetramethoxymethyl-4,4'-bishydroxy biphenyl, hexamethylol form of TrisP-PA, hexamethoxymethyl form of TrisP-PA, compounds in which 1 to 5 methylol groups of hexamethmethylol form of TrisP-PA are methoxy-methylated and bishydroxy methyl naphthalene diol.

Moreover, examples of the hydroxy anthracene compound include 1,6-dihydroxymethyl-2,7-dihydroxy anthracene, etc.

Furthermore, examples of the acyloxymethyl group-containing compound include compounds in which a part or all of the methylol groups of the methylol group-containing compound are acyloxy-methylated.

Among these compounds, preferable compounds are trimethylol phenol, bishydroxymethyl-p-cresol, tetramethylol bisphenol A, a hexamethylol form of TrisP-PA (manufactured by Honshu Chemical Industry Co., Ltd.) and phenol compounds in which methylol groups of these compounds are substituted by alkoxymethyl groups or methylol and alkoxymethyl groups.

These compounds related to (c) may be used alone or in combination.

In the invention, it is not always necessary to contain the above-mentioned cross-linking agent. When a cross-linking agent is contained, the total content of the cross-linking agent in the composition of the invention is preferably 1 to 70% by mass, more preferably 5 to 50% by mass, and most preferably 7 to 30% by mass, based on the solid component (mass) of the composition, although it depends on the kind of material.

When the total content of the cross-linking agent is 1 to 70% by mass, curability and development performance of the composition of the invention is improved.

Monomer

The composition of the invention suitably contains a monomer when the composition is constructed as a negative-type composition. The monomer will be described below. The monomer is preferably a compound having at least one addition polymerizable ethylene group and having a boiling point of 100° C. or more at atmospheric pressure. Examples of the monomer include monofunctional acrylate and methacrylate such as polyethyleneglycol mono(meth)acrylate, polypropyleneglycol mono(meth)acrylate, phenoxyethyl (meth)acrylate; (meth)acrylate compounds prepared after an addition reaction of ethylene oxide or propylene oxide to polyfunctional alcohols such as polyethyleneglycol di(meth)acrylate, trimethylolethane tri(meth)acrylate, neopentylglycol di(meth) acrylate, pentaerythritol tri(meth)acrylate, pentaerythritol tetra(meth)acrylate, dipentaerythritol penta (meth)acrylate, dipentaerythritol hexa(meth)acrylate, hexanediol (meth)acrylate, trimethylolpropane tri(acryloyloxypropyl)ether, tri(acryloyloxyethyl) isocyanulate, glycerine and trimethylolethane; urethane acrylates described in JP-B Nos. 48-41708 and 50-6034, and JP-A No. 51-37193; polyester acrylates described in JP-A No. 48-64183 and JP-B No. 49-43191 and 52-30490; polyfunctional acrylate and methacrylate of epoxyacrylate as a reaction product of an epoxy resin and (meth)acrylic acid; and mixtures thereof. The compounds described in Nihon Secchaku Kyokai-shi Vol. 20, No. 7, pp.300-308 as a photocurable monomer and an oligomer are also included in the compounds of the invention.

In the invention, The monomer is preferably (meth)acrylic ester type polymerizable compounds, more preferably tetra or higher functional (meth)acrylic ester type monomers.

The content of the monomer in the dye-containing curable composition is preferably 0.1 to 90% by mass, more preferably 1.0 to 80% by mass, and particularly 2.0 to 70% by mass relative to the solid content of the composition. When the content of the monomer is 0.1 to 90% by mass, curability and development performance of the composition of the invention is improved.

Photopolymerization Initiator

A description is provided below of the photopolymerization initiator, which may be contained in the negative-type composition of the invention. Any photopolymerization initiator capable of inducing polymerization of a polymerizable monomer may be used. The polymerization initiator is preferably chosen in view of characteristics, initiation efficiency, absorption wavelength, availability, cost, or the like.

The photopolymerization initiator is preferably a compound that will not produce any acid by decomposition. The wording "a compound that will not produce any acid by decomposition" refers to a compound that is capable of inducing polymerization of a photopolymerizable compound and thus has the photopolymerization initiator function and that will not produce any acid (such as protonic acid and Lewis acid) by photodecomposition or thermal decomposition.

Examples of the photopolymerization initiator may include trihalomethyltriazine type compounds, benzyl dimethyl ketal compounds, α-hydroxyketone compounds, α-aminoketone compounds, phosphine oxide type compounds, metallocene compounds, oxime type compounds, triarylimidazole dimers, benzothiazole type compounds, benzophenone compounds, acetophenone compounds and derivatives thereof, cyclopentadiene-benzene-iron complexes and salts thereof, halomethyloxadiazole compounds, 3-aryl-substituted cumarin compounds and the like.

Examples of the above-mentioned photo-polymerization initiator include at least one active halogen compound selected from a halomethyl oxadiazole compound and a halomethyl-s-triazine compound.

Examples of the active halogen compound that is a halomethyl oxadiazole type compound include a 2-halomethyl-5-vinyl-1,3,4-oxadiazole compound and the like, described in JP-B No. 57-6096, 2-trichloromethyl-5-styryl-1,3,4-oxadiazole, 2-trichloromethyl-5-(p-cyanostyryl)-1,3,4-oxadiazole, 2-trichloromethyl-5-(p-methoxystyryl)-1,3,4-oxadiazole.

Examples of the active halogen compound that is a halomethyl-s-triazine type compound include a vinyl-halomethyl-s-triazine compound disclosed in JP-B No. 59-1281, a 2-(naphtho-1-yl)-4,6-bis-halomethyl-s-triazine compound and a 4-(p-aminophenyl)-2,6-di-hallomethyl-s-triazine compound, described in JP-A No. 53-133428.

Moreover Specific examples of the a halomethyl-s-triazine type compound include 2,4-bis(trichloromethyl)-6-p-methoxystyryl-s-triazine, 2,6-bis(trichloromethyl)-4-(3,4-methylenedioxy phenyl)-1,3,5-triazine, 2,6-bis(trichloromethyl)-4-(4-methoxyphenyl)-1,3,5-triazine, 2,4-bis(trichloromethyl)-6-(1-p-dimethylaminophenyl-1,3-butadienyl)-s-triazine, 2-trichloromethyl-4-amino-6-p-methoxystyryl-s-triazine, 2-(naphtho-1-yl)-4,6-bis-trichloromethyl-s-triazine, 2-(4-methoxy-naphtho-1-yl)-4,6-bis-trichloromethyl-s-triazine, 2-(4-methoxy-naphtho-1-yl)-4,6-bis-trichloromethyl-s-triazine, 2-(4-ethoxy-naphtho-1-yl)-4,6-bis-trichloromethyl-s-triazine, 2-(4-butoxy-naphtho-1-yl)-4,6-bis-trichloromethyl-s-triazine, 2-[4-(2-methoxyethyl)-naphtho-1-yl]-4,6-bis-trichloromethyl-s-triazine, 2-[4-(2-ethoxyethyl)-naphtho-1-yl]-4,6-bis-trichloromethyl-s-triazine, 2-[4-(2-butoxyethyl)-naphtho-1-yl]-4,6-bis-trichloromethyl-s-triazine, 2-(2-methoxy-naphtho-1-yl)-4,6-bis-trichloromethyl-s-triazine, 2-(6-methoxy-5-methyl-naphtho-2-yl)-4,6-bis-trichloromethyl-s-triazine, 2-(6-methoxy-naphtho-2-yl)-4,6-bis-trichloromethyl-s-triazine, 2-(5-methoxy-naphtho-1-yl)-4,6-bis-trichloromethyl-s-triazine, 2-(4,7-dimethoxy-naphtho-1-yl)-4,6-bis-trichloromethyl-s-triazine, 2-(6-ethoxy-naphtho-2-yl)-4,6-bis-trichloromethyl-s-triazine, 2-(4,5-dimethoxy-naphtho-1-yl)-4,6-bis-trichloromethyl-s-triazine, 4-[p-N,N-di(ethoxycarbonylmethyl) aminophenyl]-2,6-di(trichloromethyl)-s-triazine, 4-[o-methyl-p-N,N-di(ethoxycarbonylmethyl) aminophenyl]-2,6-di(trichloromethyl)-s-triazine, 4-[p-N,N-di(chloroethyl) aminophenyl]-2,6-di(trichloromethyl)-s-triazine, 4-[o-methyl-p-N,N-di(chloroethyl) aminophenyl]-2,6-di(trichloromethyl)-s-triazine, 4-(p-N-chloroethyl aminophenyl)-2,6-di(trichloromethyl)-s-triazine, 4-(p-N-ethoxycarbonylmethyl aminophenyl)-2,6-di(trichloromethyl)-s-triazine, 4-[p-N,N-di(phenyl) aminophenyl]-2,6-di(trichloromethyl)-s-triazine, 4-(p-N-chloroethylcarbonyl aminophenyl)-2,6-di(trichloromethyl)-s-triazine, 4-[p-N-(p-methoxyphenyl) carbonylaminophenyl]-2,6-di(trichloromethyl)-s-triazine, 4-[m-N,N-di(ethoxycarbonylmethyl) aminophenyl]-2,6-di(trichloromethyl)-s-triazine, 4-[m-bromo-p-N,N-di(ethoxycarbonylmethyl) aminophenyl]-2,6-di(trichloromethyl)-s-triazine, 4-[m-chloro-p-N,N-di(ethoxycarbonyl methyl) aminophenyl]-2,6-di(trichloromethyl)-s-triazine, 4-[m-fluoro-p-N,N-di(ethoxycarbonylmethyl) aminophenyl]-2,6-di(trichloromethyl)-s-triazine, 4-[o-bromo-p-N,N-di(ethoxycarbonylmethyl) aminophenyl]-2,6-di (trichloromethyl)-s-triazine, 4-[o-chloro-p-N,N-di(ethoxycarbonylmethyl) aminophenyl]-2,6-di(trichloromethyl)-s-triazine, 4-[o-fluoro-p-N,N-di(ethoxycarbonylmethyl) aminophenyl]-2,6-di(trichloromethyl)-s-triazine, 4-[o-bromo-p-N,N-di(chloroethyl) aminophenyl]-2,6-di(trichloromethyl)-s-triazine, 4-[o-chloro-p-N,N-di(chloroethyl) aminophenyl]-2,6-di(trichloromethyl)-s-triazine, 4-[o-fluoro-p-N,N-di(chloroethyl) aminophenyl]-2,6-di(trichloromethyl)-s-triazine, 4-[m-bromo-p-N,N-di(chloroethyl) aminophenyl]-2,6-di(trichloromethyl)-s-triazine, 4-[m-chloro-p-N,N-di(chloroethyl) aminophenyl]-2,6-di(trichloromethyl)-s-triazine, 4-[m-fluoro-p-N,N-di(chloromethyl) aminophenyl]-2,6-di(trichloromethyl)-s-triazine, 4-(m-bromo-p-N-ethoxycarbonylmethyl aminophenyl)-2,6-di(trichloromethyl)-s-triazine, 4-(m-chloro-p-N-ethoxycarbonylmethyl aminophenyl)-2,6-di(trichloromethyl)-s-triazine, 4-(m-fluoro-p-N-ethoxycarbonylmethyl aminophenyl)-2,6-di(trichloromethyl)-s-triazine, 4-(o-bromo-p-N-ethoxycarbonylmethyl aminophenyl)-2,6-di(trichloromethyl)-s-triazine, 4-(o-chloro-p-N-ethoxycarbonylmethyl aminophenyl)-2,6-di(trichloromethyl)-s-triazine, 4-(o-fluoro-p-N-ethoxycarbonylmethyl aminophenyl)-2,6-di(trichloromethyl)-s-triazine, 4-(m-bromo-p-N-chloroethyl aminophenyl)-2,6-di(trichloromethyl)-s-triazine, 4-(m-chloro-p-N-chloroethyl aminophenyl)-2,6-di(trichloromethyl)-s-triazine, 4-(m-fluoro-p-N-chloroethyl aminophenyl)-2,6-di(trichloromethyl)-s-triazine, 4-(o-bromo-p-N-chloroethyl aminophenyl)-2,6-di(trichloromethyl)-s-triazine, 4-(o-chloro-p-N-chloroethyl aminophenyl)-2,6-di(trichloromethyl)-s-triazine, 4-(o-fluoro-p-N-chloroethyl aminophenyl)-2,6-di(trichloromethyl)-s-triazine.

In addition to these, the following compounds are preferably used: TAZ series manufactured by Midori Kagaku Co., Ltd. (for example, TAZ-107, TAZ-110, TAZ-104, TAZ-109, TAZ-140, TAZ-204, TAZ-113, and TAZ-123), T series manufactured by PANCHIM Co., Ltd. (for example, T-OMS, T-BMP, T-R, and T-B), Irgacure series manufactured by Ciba-Geigy, Corp. (for example, Irgacure 651, Irgacure 184, Irgacure 500, Irgacure 1000, Irgacure 149, Irgacure 819, and Irgacure 261), Darocur series (for example, Darocur 1173), 4,4'-bis(diethylamino)-benzophenone, 2-(O-benzoyloxime)-1-[4-(phenylthio) phenyl]-1,2-octane dion, 2-benzyl-2-dimethylamino-4-morpholinobutyrophenone, 2,2-dimethoxy-2-phenyl acetophenone, 2-(o-chlorophenyl)-4,5-diphenylimidazolyl dimer, 2-(o-fluorophenyl)-4,5-diphenylimidazolyl dimer, 2-(o-methoxyphenyl)-4,5-diphenylimidazolyl dimer, 2-(p-methoxyphenyl)-4,5-diphenylimidazolyl dimer, 2-(p-dimethoxyphenyl)-4,5-diphenylimidazolyl dimer, 2-(2,4-dimethoxyphenyl)-4,5-diphenylimidazolyl dimer, 2-(p-methylmercaptophenyl)-4,5-diphenylimidazolyl dimer and benzoin isopropyl ether.

Among these compounds, preferble examples of the photo-polymerization initiator in the invention include α-aminoketone type compounds, phosphine oxide type compounds, metallocene compounds, oxime type compounds and a triarylimidazole dimer from the viewpoint of selecting a compound that does not produce any acid by decomposition.

The α-aminoketone type compounds include Irgacure series manufactured by Ciba-Geigy Corp., (for example. Irgacure 907 and Irgacure 369), 2-methyl-1-phenyl-2-morpholinopropan-1-one, 2-methyl-1-[4-(hexyl)phenyl]-2-morpholinopropan-1-one, and 2-ethyl-2-dimethylamino-1-(4-morpholinophenyl)butan-1-one.

The oxime type compounds are not particularly limited and include 2-(O-benzoyloxime)-1-[4-(phenylthio)phenyl]-1,2-octanedione, 1-(4-methylsulfanylphenyl)-butane-1,2-butane-2-oxime-O-acetate, 1-(4-methylsulfanylphenyl)-butane-1-one-oxime-O-acetate, hydroxyimino-(4-methylsulfanylphenyl)-ethyl acetate-O-acetate, and hydroxyimino-(4-methylsulfanylphenyl)-ethyl acetate-O-benzoate.

From a viewpoint of availability and stability, preferable compounds include Irgacure 651 as the benzyl methyl ketal compound; Irgacure 184, 1173, 500, 1000, and 2959 as the α-hydroxyketone compound; Irgacure 907 and 369 as the α-aminoketone compound; Irgacure 1700, 149, 1850, 819, and 184 as the phosphine oxide compound; and Irgacure 784 and 261 as the metallocene compound (all manufactured by Ciba Specialty Chemicals Inc.) and also, analogous compounds and/or peripheral compounds of them are also preferable.

These photo-polymerization initiator may be used in combination with a sensitizer and a photo-stabilizer.

Specific examples of these include benzoin, benzoin methyl ether, 9-fluorenone, 2-chloro-9-fluorenone, 2-methyl-9-fluorenone, 9-anthrone, 2-bromo-9-anthrone, 2-ethyl-9-anthrone, 9,10-anthraquinone, 2-ethyl-9,10-anthraquinone, 2-t-butyl-9,10-anthraquinone, 2,6-dichloro-9,10-anthraquinone, xanthone, 2-ethylxanthone, 2-methoxyxanthone, 2-methoxyxanthone, thioxanthone, 2,4-diethylthioxanthone, acridone, 10-butyl-2-chloroacridone, benzyl, dibenzyl acetone, p-(dimethylamino) phenylstyryl ketone, p-(dimethylamino) phenyl-p-methylstyryl ketone, benzophenone, p-(dimethylamino) benzophenone (or Michler's ketone), p-(diethylamino) benzophenone, benzoanthrone, benzothiazole type compounds and the like described in JP-B No. 51-48516, and Tinuvin 1130 and Tinuvin 400.

In addition to the above-mentioned photo-polymerization initiator, other known photo-polymerization initiators may be used in the composition of the invention.

Specific examples thereof include a vicinal polyketol aldonil compound disclosed in U.S. Pat. No. 2,367,660; an α-carbonyl compound disclosed in U.S. Pat. Nos. 2,367,661 and 2,367,670; acyloin ether disclosed in U.S. Pat. No. 2,448,828; an α-hydrocarbon-substituted aromatic acyloin compound disclosed in U.S. Pat. No. 2,722,512; a polynuclear quinone compound disclosed in U.S. Pat. Nos. 3,046,127 and 2,951,758, a combination of triarylimidazole dimer/p-aminophenyl ketone disclosed in U.S. Pat. No. 3,549,367; and a combination of benzothiazole type compound/trihalomethyl-s-triazine compound disclosed in JP-B No. 51-48516.

The total content of the photo-polymerization initiator (and a known initiator) is 0.01 to 50% by mass, preferably 1 to 30% by mass, and most preferably 1 to 20% by mass, relative to the solid content (mass) of monomers. When the total content of the photo-polymerization initiator is 0.01 to 50% by mass relative to the solid content of monomers, polymerization proceeds easily, and layer strength is improved.

Solvent

The composition of the invention, if necessary, may contain a solvent in the case of preparation. Although not particularly limited as long as it satisfies the solubility of each component and coating property of the dye-containing curable composition, the solvent is preferably selected by taking into consideration the solubility, coating property, and safety of the dye and binder.

For example, the solvent that is used when the composition of the invention is prepared is preferably a solvent of esters, ethers, ketones, aromatic hydrocarbons or alcohols.

The solvent containing esters includes ethyl acetate, n-butyl acetate, isobutyl acetate, amyl formate, isoamyl acetate, isobutyl acetate, butyl propionate, isopropyl butyrate, ethyl butyrate, and butyl butyrate; alkyl esters such as methyl lactate, ethyl lactate, methyloxy acetate, ethyloxy acetate, butyloxy acetate, methylmethoxy acetate, ethylmethoxy acetate, butylmethoxy acetate, methylethoxy acetate, and ethylethoxy acetate; 3-oxypropionic acid alkyl esters such as methyl 3-oxypropionate, and ethyl 3-oxypropionate, e.g., methyl 3-methoxypropionate, ethyl 3-methoxypropionate, methyl 3-ethoxypropionate, and ethyl 3-ethoxypropionate; 2-oxypropionic acid alkyl esters such as methyl 2-oxypropionate, ethyl 2-oxypropionate and propyl 2-oxypropionate, e.g., methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, and ethyl 2-ethoxy-2-methylpropionate; methyl pyruvate, ethyl pyruvate, propyl pyruvate, methyl acetoacetate, ethyl acetoacetate, methyl 2-oxobutanoate, and ethyl 2-oxobutanoate; ethers such as diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, propylene glycol methyl ether, propylene glycol methyl ether acetate, propylene glycol ethyl ether acetate, and propylene glycol propyl ether acetate; ketones such as methyl ethyl ketone, cyclohexanone, 2-heptanone, and 3-heptanone; and aromatic hydrocarbons such as toluene and xylene.

Of these, preferably used compounds are methyl 3-ethoxypropionate, ethyl 3-ethoxypropionate, ethyl cellosolve acetate, ethyl lactate, diethylene glycol dimethyl ether, butyl acetate, methyl 3-methoxypropionate, 2-heptanone, cyclohexanone, ethyl carbitol acetate, butyl carbitol acetate, propylene glycol methyl ether and propylene glycol methyl ether acetate.

Various Additives

The composition of the invention can be blended if necessary with various additives such as fillers, polymer compounds other than those described above, a surfactant, an adhesion promoter, an antioxidant, a UV absorber, an aggregation inhibitor etc.

Examples of the various additives include fillers such as glass and alumina; polymer compounds such as polyvinyl alcohol, polyacrylic acid, polyethylene glycol monoalkyl ether and polyfluoroalkyl acrylate other than binder resin; surfactants such as nonionic, cationic or anionic surfactants; adhesion promoters such as vinyl trimethoxy silane, vinyl triethoxy silane, vinyl tris(2-methoxyethoxy) silane, N-(2-aminoethyl)-3-aminopropylmethyl dimethoxy silane, N-(2-aminoethyl)-3-aminopropyl trimethoxy silane, 3-aminopropyl triethoxy silane, 3-glycidoxypropyl trimethoxy silane, 3-glycidoxy propylmethyl dimethoxy silane, 2-(3,4-epoxycyclohexyl)ethyl trimethoxy silane, 3-chloropropylmethyl dimethoxy silane, 3-chloropropyl trimethoxy silane, 3-methacryloxy propyltrimethoxy silane and 3-mercaptopropyl trimethoxy silane; antioxidants such as 2,2-thiobis(4-methyl-6-t-butylphenol) and 2,6-di-t-butyl phenol; UV absorbers such as 2-(3-t-butyl-5-methyl-2-hydroxyphenyl)-5-chlorobenzotriazole and alkoxy benzophenone; and aggregation inhibitors such as polysodium acrylate.

For improving the alkali solubility of a non-image region and further improving the development performance of the composition of the invention, an organic carboxylic acid, preferably a low-molecular organic carboxylic acid having a molecular weight of 1000 or less, can be added to the composition.

Examples of the organic carboxylic acid include aliphatic monocarboxylic acids such as formic acid, acetic acid, propionic acid, butyric acid, valeric acid, pivalic acid, caproic acid, diethylacetic acid, enanthic acid and caprylic acid; aliphatic dicarboxylic acids such as oxalic acid, malonic acid, succinic acid, glutaric acid, adipic acid, pimelic acid, suberic acid, azelaic acid, sebacic acid, brassylic acid, methylmalonic acid, ethylmalonic acid, dimethylmalonic acid, methylsuccinic acid, tetramethylsuccinic acid and citraconic acid; aliphatic tricarboxylic acids such as tricarballylic acid, aconitic acid and camphoronic acid; aromatic monocarboxylic acids such as benzoic acid, toluic acid, cuminic acid, hemellitic acid and mesitylenic acid; aromatic polycarboxylic acids such as phthalic acid, isophthalic acid, terephthalic acid, trimellitic acid, trimesic acid, mellophanic acid and pyromellitic acid; and other carboxylic acids such as phenylacetic acid, hydratropic acid, hydrocinnamic acid, mandelic acid, phenylsuccinic acid, atropic acid, cinnamic acid, methyl cinnamate, benzyl cinnamate, cinnamylideneacetic acid, coumaric acid and umbellic acid.

Positive-type Composition

According to the invention, a positive-type composition may be provided for forming a positive image. In this case, the composition may comprise a metal salt having a di-valence or higher valence as a colorant, a photosensitive agent, and a solvent. Such a composition may further contain a curing agent. Alternatively, the composition may comprise the metal salt having a di-valence or higher valence, a photo-acid generator, a curing agent, and a solvent. The photosensitive agent preferably includes o-benzoquinone diazide sulfonate or a naphthoquinone diazide compound. Any of the above solvents may appropriately be selected for use as the solvent.

Examples of the naphthoquinone diazide compound include o-naphthoquinonediazide-5-sulfonate, o-naphthoquinonediazide-5-sulfonamide, o-naphthoquinonediazide-4-sulfonate, and o-naphthoquinonediazide-4-sulfonamide. According to any known method, these esters or amide compounds may be produced with the phenol compound represented by the formula (I) disclosed in JP-A Nos. 02-84650 and 03-49437 or the like. The photosensitive agent is preferably o-benzoquinone diazide sulfonate or o-naphthoquinone diazide sulfonate.

The photo-acid generator may be any compound capable of producing an acid by light irradiation in a light exposure process. Examples of such a photo-acid generator include an organic halide, an onium salt, and a sulfonate ester.

The curing agent may be any compound selected from the above examples of the cross-linking agent.

In a preferred mode of the positive-type composition of the invention, 2 to 50% by mass of the alkali-soluble phenol resin and 2 to 30% by mass of the cross-linking agent are generally dissolved in the organic solvent. In a preferred manner, 2 to 30% by mass of the naphthoquinone diazide compound and 2 to 50% by weight of the organic solvent-soluble dye are used and added, based on the amount of the solution in which the alkali-soluble resin and the cross-linking agent are dissolved.

Color Filter

The color filter of the invention is produced with the composition of the invention. Thus, the color filter of the invention contains a colorant of a metal salt having a di-valence or higher valence.

The metal salt having a di-valence or higher valence is preferably a metal salt having a di-valence or higher valence of an acid dye. The acid dye preferably includes any of an azo compound and a phthalocyanine compound and more preferably includes at least one of a γ acid-azo compound and a pyrazolone azo compound.

The metal salt having a di-valence or higher valence preferably includes the compound represented by the formula (I):

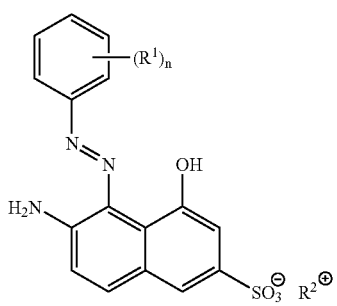

Formula (I)

wherein $R^1$ represents a hydrogen atom, an alkyl group having 1 to 21 carbon atoms, an alkoxy group having 1 to 21 carbon atoms, or an electron-attractive group; $R^2$ represents a cation having a charge equal to 1 valence of a cation of a metal atom having a valence of at least 2; and n represents an integer from 0 to 5.

The color filter of the invention preferably further contains a binder, which preferably contains an alkali-soluble (meth)acrylic polymer. The alkali-soluble (meth)acrylic polymer preferably has a polymerizable side chain.

The color filter of the invention may be produced by a process including applying the composition of the invention to a substrate by a method of application such as spin coating, cast coating and roller coating to form a radiosensitive composition layer; exposing the layer to light through a specific mask pattern; and developing the exposed layer with a developer to form a colored pattern. Thus, the method of producing the color filter of the invention includes applying the composition of the invention to a substrate, then exposing the composition to light through a mask, and forming a pattern by development. If necessary, this method may include curing the resist pattern by heating and/or exposure to light, or such a process may be repeatedly performed twice or more.

In the above process, ultraviolet radiation at g-line, h-line, i-line, or the like is particularly preferably used.

For example, the substrate may be a glass substrate for use in a liquid crystal display, such as a soda glass, a Pyrex (R) glass, a quartz glass, and a substrate comprising any of the above glasses and a transparent conductive layer attached thereto; or a photoelectric conversion element substrate for use in a pickup device or the like, such as a silicon substrate and the like and a complementary metal-oxide semiconductor (CMOS) and the like. In some cases, any of these substrates may have black stripes for separating pixels from each other.

If necessary, any of these substrates may be provided with an undercoat layer for improving adhesion to the upper layer, preventing material diffusion or planarizing the substrate surface.

In the method of producing the color filter of the invention, the developer may be any composition in which the composition of the invention is soluble and in which the irradiated part is insoluble. Examples of such a composition include a combination of different organic solvents and an aqueous alkaline solution.

The organic solvents may be any of the above solvents for use in the preparation of the composition of the invention.

For example, the aqueous alkaline solution contains a basic compound such as sodium hydroxide, potassium hydroxide, sodium carbonate, sodium silicate, sodium metasilicate, aqueous ammonia, ethylamine, diethylamine, dimethylethanolamine, tetramethylammonium hydroxide, tetraethylammonium hydroxide, choline, pyrrole, piperidine, and 1,8-diazabicyclo-[5.4.0]-7-undecene. Such a basic compound may be dissolved at a concentration of 0.001 to 10% by mass, preferably of 0.01 to 1% by mass. In the case that a developer comprising such an aqueous alkaline solution is used, washing with water is generally performed after the development.

The color filter of the invention may be used in liquid crystal displays or solid image pickup devices such as CCD and particularly preferably used in high resolution CCD or CMOS devices or the like having more than million pixels. For example, the color filter of the invention may be placed between a light receiving part of each CCD-forming pixel and a condensing microlens.

EXAMPLES

The present invention is more specifically described by means of e examples below, which are not intended to limit the scope of the vention. Unless otherwise stated, "part(s)" means part(s) by mass.

Synthesis Example 1

(Synthesis of Illustrative Compound (1))

Illustrative Compound (1) was synthesized according to Scheme 1 below.

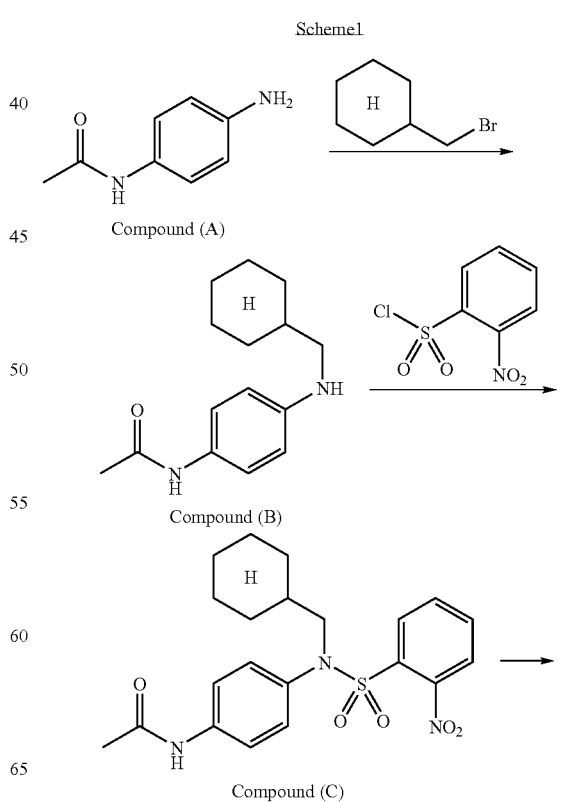

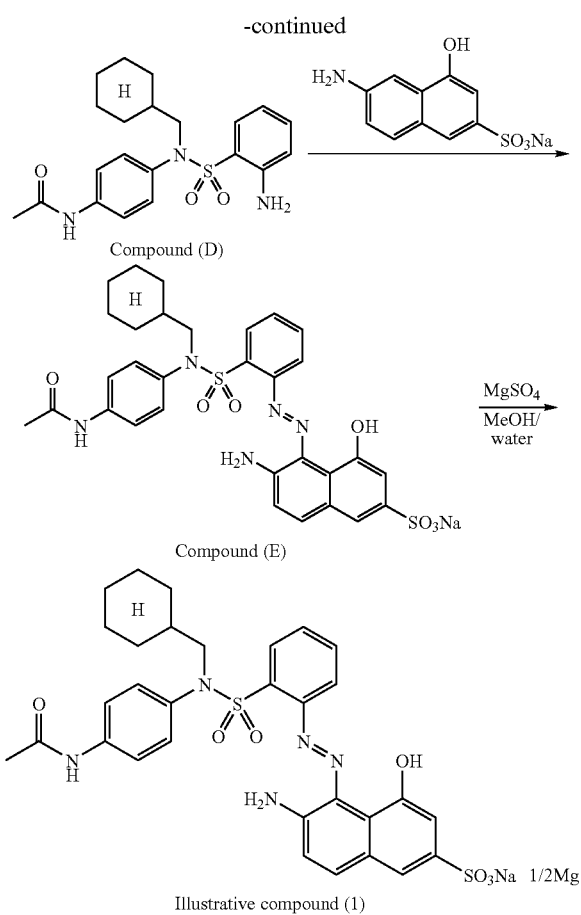

Compound (D)

Compound (E)

Illustrative compound (1)

A mixture of 7.00 g of Compound (A), 8.54 g of cyclohexylmethyl bromide, 20 g of dimethylformamide (DMF), and 4.72 g of triethylamine was stirred at 50° C. for 6 hours. The mixture was poured into water and extracted with ethyl acetate. The resulting ethyl acetate phase was washed with water several times. Magnesium sulfate and activated carbon were then added to the ethyl acetate phase. After dried and decolorized, the ethyl acetate phase was filtered with Celite and then condensed. Recrystallization from hexane/ethyl acetate was performed so that 6.83 g of Compound (B) was obtained (59.5% yield).

With 30 ml of acetone was mixed 5.01 g of o-nitrobenzenesulfonyl chloride and dissolved. To the resulting solution was gradually added 5.73 g of the resulting Compound (B) and heated to 50° C. After 8.22 g of an aqueous solution of 20% sodium carbonate was added dropwise thereto, the resulting mixture was stirred for one hour and then heated to 70° C. and further stirred for one hour. The resulting mixture was poured into water and extracted with ethyl acetate. The resulting ethyl acetate phase was washed with an aqueous solution of 4% sulfuric acid. Magnesium sulfate and activated carbon were added to the ethyl acetate phase. After dried and decolorized, the ethyl acetate phase was filtered with Celite and then condensed so that 8.5 g of Compound (C) was obtained (87% yield).

A mixture of 3.8 g of reduced iron, 2.4 g of acetic acid and 7.2 g of water was then stirred at 80° C. A dichlorobenzene solution of the resulting Compound (C) (8.5 g) was added dropwise to the mixture and stirred at 80° C. for 2 hours. Also, 1.39 g of sodium carbonate was added thereto and stirred at 80° C. for 30 minutes. Celite and activated carbon were then added and filtered out. The resulting organic layer was then steam-distilled to give 6.16 g of Compound (D) (78% yield).

A mixture of 3.32 g of the resulting Compound (D), 0.08 g of tetraethylammonium chloride, 2.5 ml of acetic acid, and 3.8 ml of 36% hydrochloric acid was cooled to 0° C. An aqueous solution of sodium sulfite ($NaNO_2$: 0.58 g, water: 1.7 g) was added dropwise to the mixture while the inner temperature was kept at 5° C. or less. Stirring was then performed for 3 hours while the temperature was kept at 5 to 10° C., so that a diazo solution was obtained.

The diazo solution was then added dropwise to a separately prepared aqueous alkali solution of γ acid (2.11 g of γ acid, 16.5 g of water and 0.35 g of NaOH) at 0° C. over 30 minutes. Also, 5 ml of an aqueous solution of 40% sodium acetate was added dropwise thereto over one hour. Stirring was then performed at 0° C. for 2 hours. Thereafter, 20 ml of an aqueous solution of 10% sodium carbonate was added dropwise, and stirring was performed overnight. After the stirring, 7.0 g of an aqueous solution of 50% NaOH was added dropwise. The resulting mixture was stirred for one hour while heated at 65° C., and then cooled to room temperature. The resulting mixture was filtered and washed with alkaline brine so that 4.3 g of Compound (E) was obtained (77% yield).

In 12 ml of MeOH (methanol) was dissolved 1.64 g of the resulting Compound (E), and 2 ml of water was added to the resulting solution and stirred. Then, 5 g of $MgSO_4$ was added, stirred and allowed to stand overnight, and then 10 ml of ethyl acetate was added. After the addition, $MgSO_4$ was removed by filtration. The resulting MeOH solution was condensed to give Illustrative Compound (1) (yield: 1 g).

Synthesis Example 2

(Synthesis of Illustrative Compound (10))

A mixture of 6.06 g of Compound (E) obtained in Synthesis Example 1, 30 ml of MeOH, 0.9 g of 36% hydrochloric acid, and 6 ml of distilled water was prepared in the form of a solution. $Sr(OH)_2 \cdot 8H_2O$ was added to the resulting solution and stirred for 30 minutes. Then, 450 ml of acetone and 450 ml of ethyl acetate were added to the solution so that an inorganic salt was precipitated. Filtration and washing with acetone were then performed. After the washing, the filtrate was condensed to give Illustrative Compound (10) (yield: 5.05 g).

Example 1

(1) Preparation of Resist Solution

The components below were mixed to form a resist solution.

| [Composition] | |
|---|---|
| Propylene glycol monomethylether acetate(PGMEA) | 19.20 parts |
| Ethyl lactate | 30.00 parts |
| Cyclohexanone | 6.67 parts |
| Binder (PGMEA solution of 41% allylmethacrylate/methacrylic acid copolymer (in a molar ratio of 77:23)) | 30.51 parts |
| Dipentaerythritol hexaacrylate | 12.20 parts |
| Polymerization inhibitor (p-methoxyphenol) | 0.0075 parts |
| Fluorosurfactant | 0.95 parts |
| Photopolymerization initiator | 0.600 parts |

(2-(o-benzoyloxime)-1-[4-(phenylthio)phenyl]-1,2-octanedione)

(2) Preparation of Undercoat Layer-Attached Glass Substrate

A glass substrate (Corning 1737) was ultrasonically washed in an aqueous 1% NaOH solution, then washed with water, and baked to be dewatered (at 200° C. for 30 minutes).

The resist solution of the above section (1) was then applied at a thickness of 2 µm to the cleaned glass substrate by means of a spin coater and heated and dried at 220° C. for one hour to form an undercoat layer.

(3) Preparation of Colorant-Containing Resist Solution

A mixture of 9.4 g of the resist solution obtained in the above section (1) and 0.6 g of Illustrative Compound (1) was prepared in the form of a solution so that a colorant-containing resist solution was obtained.

(4) Exposure of the Colorant-Containing Resist to Light and Development (Image Formation)

The colorant-containing resist solution obtained in the above section (3) was applied at a thickness of 1.0 µm to the undercoat layer of the undercoat layer-attached glass substrate obtained in the above section (2) by means of a spin coater and pre-baked at 120° C. for 120 seconds.

In a light exposure apparatus, the coating layer was then irradiated through a 20 µm mask at a wavelength of 365 nm and at a light exposure of 800 mJ/cm$^2$. After the exposure to light, a liquid developer (a 60% solution of CD-2000 (trade name) manufactured by Fujifilm Arch Co., Ltd.) was used to develop the coating layer under the conditions of 26° C. and 60 seconds. Thereafter, the coating layer was rinsed with running water for 20 seconds and then spray-dried to form an image. In the usual way, the formed image was examined by optical microscope observation and SEM photograph observation.

[Evaluation]

The obtained image was evaluated as described below. The results are shown in Table 1.

(Development performance of Unexposed Part and Residual Layer Rate of Exposed Part)

A chromoscope (MCPD-1000 (trade name) manufactured by Otsuka Electronics Co., Ltd.) was used to measure the development performance of the unexposed part and the residual layer rate of the exposed part with respect to the resulting image.

Herein, "development performance of the unexposed part" is defined as a rate (%) of change in the absorbance value of the layer before and after the development. In the case of the negative-type colorant-containing resist, a greater value of the rate of change means a better development characteristic. Herein, "residual layer rate of the exposed part" is defined as a rate (%) of maintained absorbance value of the layer before and after the development. In the case of the negative-type colorant-containing resist, a greater value of the rate means a better pattern shape.

Thus, high values of both the development performance of the unexposed part and the residual layer rate of the exposed part mean a good pattern-forming property (a good development property) in the case of the negative-type colorant-containing resist.

In contrast, the values of the development performance of the unexposed part and the residual layer rate of the exposed part are preferably as low as possible in the case of the positive-type colorant-containing resist. Thus, low values of both the development performance of the unexposed part and the residual layer rate of the exposed part mean a good pattern-forming property (a good development property) in the case of the positive-type colorant-containing resist.

(Heat Resistance)

The glass substrate with the applied colorant-containing resist solution was heated at 200° C. for one hour by means of a hot plate. A chromoscope (MCPD-1000 (trade name) manufactured by Otsuka Electronics Co., Ltd.) was used to measure a change in chromaticity, a ΔEab value. A lower ΔEab value means better heat resistance.

(Light Fastness)

The glass substrate with the applied dye resist solution was irradiated with 200,000 lux of light from a xenon lamp for 10 hours (corresponding to 2,000,000 lux.h). Thereafter, a change in chromaticity, a ΔEab value, was measured. A lower ΔEab value means better light fastness.

Examples 2 to 7

An image was formed using the process of Example 1 except that the compound as shown in Table 1 was alternatively used as the colorant in the preparation of the colorant-containing resist solution as shown in the section (3). Evaluations were made in the same manner. The results are shown in Table 1 together with those of Example 1.

Examples 8 to 14

Patterned images were each produced using the process of each of Examples 1 to 7 except that a silicon wafer substrate was used in place of the glass substrate. Concerning the development performance of the unexposed part and the residual layer rate of the exposed part, the results were the same as those of Examples 1 to 7.

Examples 8 to 14 differ in using the silicon wafer substrate from Examples 1 to 7. In all of Examples 1 to 14, however, the colorant resist solution was applied onto the undercoat layer so that no substantial difference was made and that the resulting performances were the same.

Example 15

An image was formed using the process of Example 1 except that TAZ-107 (manufactured by Midori Kagaku Co., Ltd.) was alternatively used as the photopolymerization initiator in the preparation of the resist solution as shown in the section (1). Evaluations were made in the same manner. The results are shown in Table 1 together with those of Example 1.

Example 16

An image was formed using the process of Example 1 except that 2-benzyl-2-dimethylamino-4-morpholinobutyrophenone was alternatively used as the photopolymerization initiator in the preparation of the resist solution as shown in the section (1). Evaluations were made in the same manner. The results are shown in Table 1 together with those of Example 1.

Comparative Example 1

An image was formed using the process of Example 1 except that the comparative compound as shown below was alternatively used as the colorant in the preparation of the colorant-containing resist solution as shown in the section (3). Evaluations were made in the same manner. The results are shown in Table 1 together with those of Example 1.

Comparative Compound

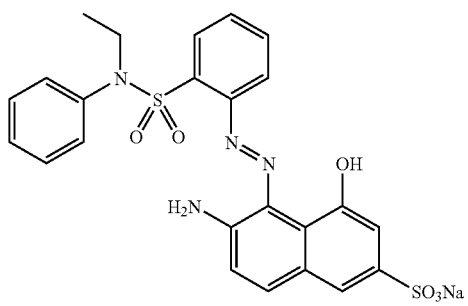

Example 17

An image was formed using the process of Example 1 except that a positive-type colorant-containing resist solution of a mixture of the components below was alternatively used as the colorant-containing resist solution. Evaluations were made in the same manner. The results are shown in Table 1 together with those of Example 1.

| [Composition] | |
|---|---|
| Ethyl lactate | 210.0 parts |
| Novolac resin of a condensation product of p-cresol and formaldehyde (with a molecular weight of 5500 in terms of polystyrene molecular weight) | 20.0 parts |
| Hexamethoxymethylol melamine | 15.0 parts |
| Above illustrative Compound (1) | 35.0 parts |
| Esterification product of 2,3,4-trihydroxybenzophenone and o-naphthoquinonediazide-5-sulfonyl chloride (esterification rate: 80% by mole, a quinonediazide compound) | 15.0 parts |
| Ester of [4-(7,8-dihydroxy-2,4,4-trimethyl-2-chromanyl) pyrogallol] and o-naphthoquinonediazide-5-sulfonic acid | 15.0 parts |

Examples 18 to 21

An image was formed using the process of Example 1 except that each colorant was alternatively used as shown in Table 1 below. Evaluations were made in the same manner. The results are shown in Table 1 together with those of Example 1.

TABLE 1

| | Colorant | Development performance of Unexposed Part | Residual Layer Rate of Exposed Part | Heat Resistance ΔEab (200° C./1 h) | Light Fastness ΔEab (2 M lux · h) |
|---|---|---|---|---|---|
| Example 1 | Illustrative Compound (1) | 100 | 100 | 2.15 | 1.88 |
| Example 2 | Illustrative Compound (2) | 100 | 98 | 1.85 | 1.85 |
| Example 3 | Illustrative Compound (3) | 100 | 93 | 7.55 | 2.25 |
| Example 4 | Illustrative Compound (4) | 100 | 98 | 3.75 | 2.95 |
| Example 5 | Illustrative Compound (5) | 100 | 95 | 4.80 | 2.90 |
| Example 6 | Illustrative Compound (6) | 100 | 99 | 3.70 | 2.80 |
| Example 7 | Illustrative Compound (7) | 100 | 100 | 5.25 | 3.35 |
| Example 15 | Illustrative Compound (1) | 100 | 100 | 5.55 | 4.60 |
| Example 16 | Illustrative Compound (1) | 100 | 91 | 2.20 | 2.30 |
| Example 17 | Illustrative Compound (1) | 0 | 0 | 3.56 | 3.87 |
| Example 18 | Illustrative Compound (9) | 100 | 100 | 2.05 | 2.85 |
| Example 19 | Illustrative Compound (10) | 100 | 100 | 1.95 | 2.35 |

TABLE 1-continued

|  | Colorant | Development performance of Unexposed Part | Residual Layer Rate of Exposed Part | Heat Resistance ΔEab (200° C./1 h) | Light Fastness ΔEab (2 M lux · h) |
|---|---|---|---|---|---|
| Example 20 | Illustrative Compound (11) | 100 | 97 | 3.35 | 2.95 |
| Example 21 | Illustrative Compound (12) | 100 | 98 | 3.05 | 2.75 |
| Comparative Example 1 | Comparative Compound | 85 | 23 | 18.55 | 11.85 |

Table 1 indicates that in each resulting curable composition that contains a colorant of a metal salt having a di-valence or higher valence according to the invention, the colorant exhibits good heat-resistance performance and good light-fastness performance, while it is conventionally difficult to satisfy the performances of Table 1 at the same time. Improvements are also obtained in the development performance of the unexposed part and the residual layer rate of the exposed part.

It is also apparent from the results of Table 1 that Comparative Example 1 using a conventional dye is inferior in performance with respect to the development performance of the unexposed part, the residual layer rate of the exposed part, heat resistance, and light fastness.

The results of Example 17 also show that the composition of the invention can have a good pattern-forming property even when applied to the positive-type.

The invention provides a curable composition in which a colorant can exhibit good heat resistance and good light fastness. The invention also provides a colorant-containing curable composition that can provide an improved development performance of unexposed part and an improved residual layer rate of exposed part and can have a good pattern-forming property, a color filter produced with such a composition, and a method of producing the color filter.

What is claimed is:

1. A composition comprising:
a colorant comprising a metal salt having a di-valence or higher valence;
a photopolymerization initiator; and
a monomer,
wherein the metal salt having a di-valence or higher valence includes a compound represented by the following formula (I):

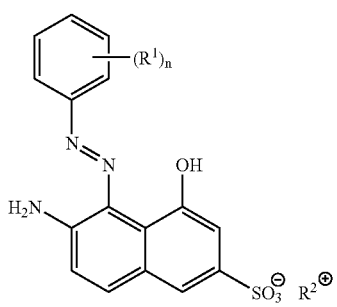

Formula (I)

wherein $R^1$ represents a hydrogen atom, an alkyl group having 1 to 21 carbon atoms, an alkoxy group having 1 to 21 carbon atoms, or an electron-attractive group; $R^2$ represents a cation having a charge equal to 1 valence of a cation of a metal atom having a valence of at least 2; and n represents an integer from 0 to 5.

2. The composition according to claim 1, wherein the metal salt having a di-valence or higher valence includes a metal salt of an acid dye, having a valence of at least 2.

3. The composition according to claim 2, wherein the metal salt having a di-valence or higher valence of the acid dye includes at least one compound selected from the group consisting of azo compounds and phthalocyanine compounds.

4. The composition according to claim 2, wherein the metal salt having a di-valence or higher valence of the acid dye includes at least one compound selected from the group consisting of γ acid-azo compounds and pyrazolone azo compounds.

5. The composition according to claim 1, further comprising a binder, which includes an alkali-soluble (meth)acrylic polymer.

6. The composition according to claim 5, wherein the alkali-soluble (meth)acrylic polymer has a polymerizable side chain.

7. The composition according to claim 1, further comprising a (meth)acrylic ester type polymerizable compound.

8. The composition according to claim 1, further comprising a tetra or higher functional (meth)acrylic ester type monomer.

9. The composition according to claim 1, wherein the photopolymerization initiator includes at least one compound selected from the group consisting of trihalomethyltriazine compounds, benzyl dimethyl ketal compounds, α-hydroxyketone compounds, α-aminoketone compounds, phosphine oxide compounds, metallocene compounds, oxime compounds, a triarylimidazole dimer, benzothiazole compounds, benzophenone compounds, acetophenone compounds and derivatives thereof, a cyclopentadiene-benzene-iron complexs and a salts thereof, halomethyloxadiazole compounds, and 3-aryl-substituted coumarin compounds.

10. The composition according to claim 1, wherein the photopolymerization initiator includes at least one compound that does not produce any acid by decomposition.

11. The composition according to claim 1, wherein the photopolymerization initiator includes at least one compound selected from the group consisting of α-aminoketone compounds, phosphine oxide compounds, metallocene compounds, oxime compounds, and a triarylimidazole dimer.

12. The composition according to claim 1, further comprising a cross-linking agent.

13. The composition according to claim 1, further comprising an alkali-soluble binder.

14. A method of producing a color filter, comprising:
applying to a substrate a colorant-containing curable composition comprising:
a colorant comprising a metal salt having a di-valence or higher valence;
a photopolymerization initiator; and
a monomer,
wherein the metal salt having a di-valence or higher valence includes a compound represented by the following formula (I):

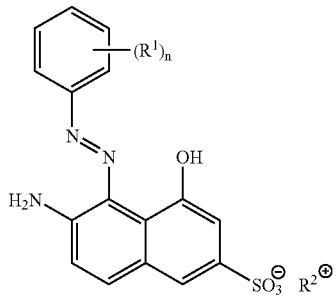

Formula (I)

wherein $R^1$ represents a hydrogen atom, an alkyl group having 1 to 21 carbon atoms, an alkoxy group having 1 to 21 carbon atoms, or an electron-attractive group; $R^2$ represents a cation having a charge equal to 1 valence of a cation of a metal atom having a valence of at least 2; and n represents an integer from 0 to 5; exposing the composition to light through a mask; and developing the composition to form a patterned image.

* * * * *